United States Patent
Ding et al.

(10) Patent No.: US 8,201,951 B2
(45) Date of Patent: Jun. 19, 2012

(54) CATADIOPTRIC PROJECTORS

(75) Inventors: Yuanyuan Ding, Minneapolis, MN (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 587 days.

(21) Appl. No.: 12/488,190

(22) Filed: Jun. 19, 2009

(65) Prior Publication Data
US 2010/0123784 A1 May 20, 2010

Related U.S. Application Data

(60) Provisional application No. 61/116,152, filed on Nov. 19, 2008.

(51) Int. Cl.
 *G03B 21/14* (2006.01)
(52) U.S. Cl. .......................... 353/121; 382/276
(58) Field of Classification Search ............. 353/69, 353/70, 121, 122; 348/333.1, 745, 211.1; 382/165, 174, 295
See application file for complete search history.

(56) References Cited

U.S. PATENT DOCUMENTS

| 7,088,426 | B2 | 8/2006 | Hirukawa et al. | |
|---|---|---|---|---|
| 7,412,159 | B2 | 8/2008 | Ichimiya | |
| 7,901,093 | B2 * | 3/2011 | Tan et al. ................ | 353/121 |
| 2010/0034429 | A1 * | 2/2010 | Drouin et al. ............. | 382/108 |
| 2011/0010411 | A1 * | 1/2011 | Tan ........................ | 708/520 |
| 2011/0176007 | A1 * | 7/2011 | Ding et al. ............... | 348/189 |

OTHER PUBLICATIONS

Seitz, S. M., et al., "A Theory of Inverse Light Transport", Computer Vision, 2005. ICCV 2005. Tenth IEEE International Conference, vol. 2, pp. 1440-1447, Oct. 17-21, 2005.

Sen, P., et al. "Dual Photography", ACM SIGGRAPH 2005 conference proceedings, 2005.

Srinivasan, M. V., "A New Class of Mirrors for Wide-Angle Imaging", Computer Vision and Pattern Recognition Workshop Conference, Jun. 2003.

Sukthankar, R., et al., "Smarter Presentations: Exploiting Homography in Camera-Projector Systems", Proceedings of International Conference on Computer Vision, 2001.

Swaminathan, R., et al., Non-Single Viewpoint Catadioptric Cameras: Geometry and Analysis, International Journal of Computer Vision, 2006.

Yang, R., et al., "PixelFlex: A Reconfigurable Multi-Projector Display System", Proceedings of IEEE Visualization, 2001.

Grossberg, M. D., et al., "Making One Object Look Like Another: Controlling Appearance Using a Projector-Camera System", Proceedings of the IEEE Computer Society Conference on Computer Vision and Pattern Recognition, 2004.

Raskar, R., et al., "Non-photorealistic Camera: Depth Edge Detection and Stylized Rendering using Multi-Flash Imaging", International Conference on Computer Graphics and Interactive Techniques ACM SIGGRAPH 2005.

(Continued)

*Primary Examiner* — William C Dowling

(57) ABSTRACT

Herein is presented a catadioptric projector by combining a commodity digital projector with additional optical units. By using specially shaped reflectors and/or refractors, a catadioptric projector can offer an unprecedented level of flexibility in aspect ratio, size, and field of view. Also presented, are methods to reduce projection artifacts in catadioptric projectors, such as distortions, scattering, and defocusing. By analysis of projection defocus of reflector and thin refractor based catadioptric projectors, it is shown that defocus blur can be interpreted as spatially-varying Gaussian blurs on an input image. Kernels are measured directly from a light transport matrix, T, and de-convolution is applied to optimize an input image. Practical uses of catadioptric projectors in panoramic and omni-directional projections are also demonstrated.

13 Claims, 17 Drawing Sheets

OTHER PUBLICATIONS

Baker, S., et al., "A Theory of Catadioptric Image Formation", Proceedings of the 6th International Conference on Computer Vision, Bombay, pp. 35-42, Jan. 1998.

Brown, M. S., et al., "Image Pre-conditioning for Out-of-Focus Projector Blur", Proceedings of the 2006 IEEE Computer Society Conference on Computer Vision and Pattern Recognition, Jan. 2006.

Chen, H., et al., "Scalable Alignment of Large-Format Multi-Projector Displays Using Camera Homography Trees", Proceedings of IEEE Visualization 2002, pp. 339-346, Nov. 2002.

Fujii, K., et al., "A Projector-Camera System with Real-Time Photometric Adaptation for Dynamic Environments", Computer Vision and Pattern Recognition, IEEE Computer Society Conference, p. 1180, vol. 2, Jun. 20-25, 2005.

Lantz, E., "A Survey of Large-Scale Immersive Displays", ACM SIGGRAPH in the Emerging Display Technology Conference Proceedings, Aug. 2007.

Nayar, S. K., "Catadioptric Omnidirectional Camera" IEEE Computer Society Conference on Computer Vision and Pattern Recognition, CVPR, pp. 482, 1997.

Nayar, S. K., et al., "360×360 Mosaics", IEEE Computer Vision and Pattern Recognition Conference, vol. 2, pp. 388-395, 2000.

Peri, V. N., et al., "Generation of Perspective and Panoramic Video from Omnidirectional Video", Proc. of DARPA Image Understanding Workshop, May 1997.

Raskar, R., et al., "iLamps: Geometrically Aware and Self-Configuring Projectors", Appears in ACM SIGGRAPH Conference Proceedings, 2003.

Raskar, R., et al., "Shader Lamps: Animating Real Objects with Image-Based Illumination", Technical Report. UMI Order No. TR00-027, 2000.

Raskar, R., et al., "The Office of the Future: A Unified Approach to Image-Based Modeling and Spatially Immersive Displays", Computer Graphics Proceedings, Annual Conference Series, Jul. 19-24, 1998.

Yu, J., et al., "Focal Surfaces of Discrete Geometry", Eurographics Symposium on Geometry Processing, 2007.

Underkoffler, J., et al., "Illuminating Light: An Optical Design Tool with a Luminous-Tangible Interface", Conference on Human Factors in Computing Systems, Proceedings of the SIGCHI conference on Human factors in computing systems, pp. 542-549, 1998.

Zhang, L., et al., "Projection defocus analysis for scene capture and image display", ACM SIGGRAPH, pp. 907-905, 2006.

Gupta, R., et al., "Linear Pushbroom Cameras", IEEE Trans. Pattern Analysis and Machine Intelligence, vol. 19, No. 9, pp. 963-975, Sep. 1997.

\* cited by examiner

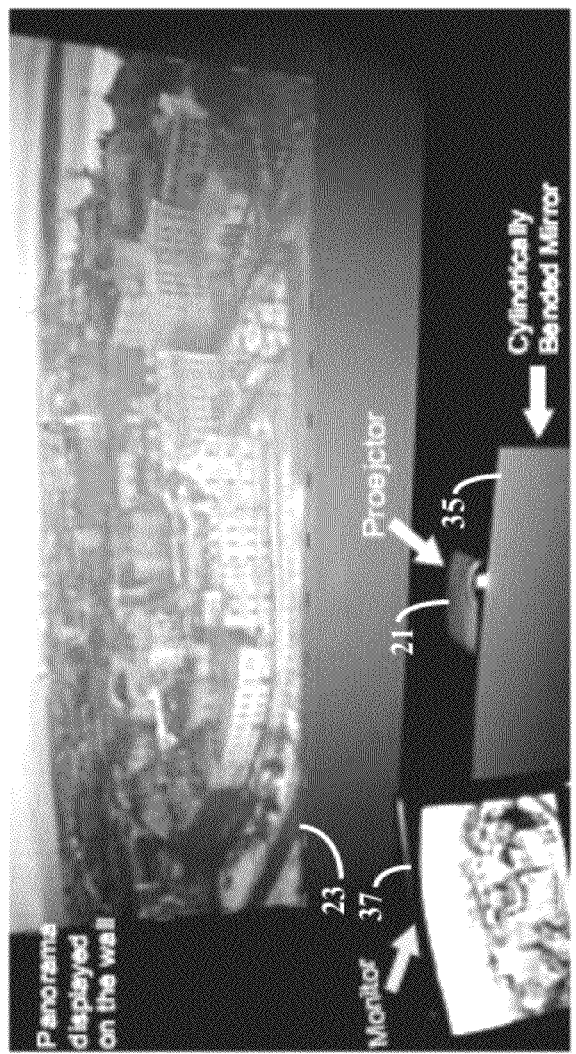
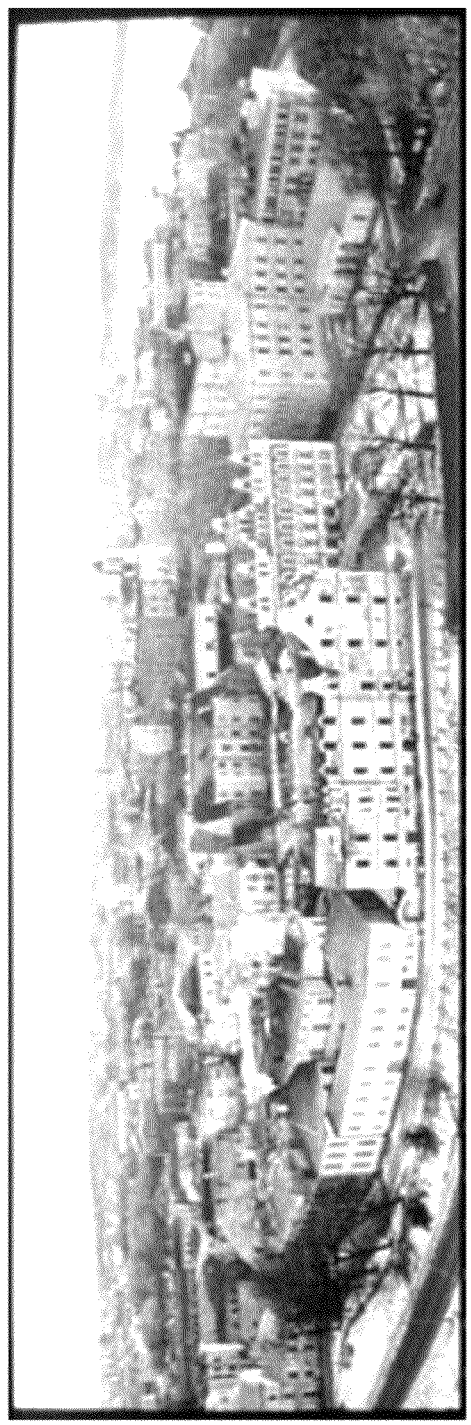

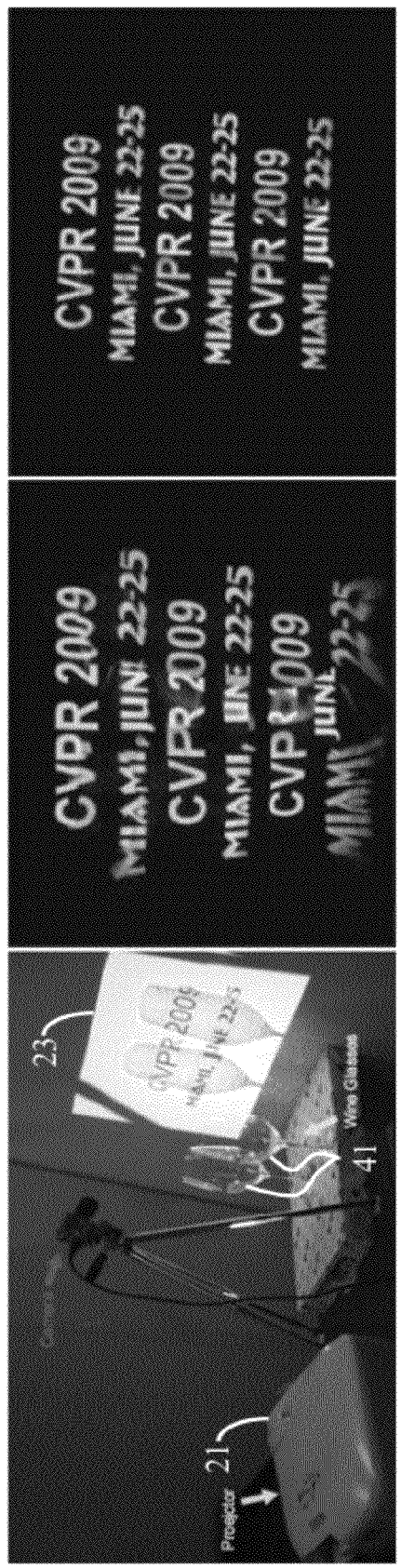

CATADIOPTRIC PROJECTORS

CROSS-REFERENCE TO RELATED APPLICATIONS

This application claims the benefit of U.S. Provisional Application No. 61/116,152 filed Nov. 19, 2008 under 35 U.S.C. §119(e) and is hereby incorporated by reference in its entirety.

BACKGROUND

1. Field of Invention

The present invention is directed towards methods of creating and optimizing images in a catadioptric projector system. More specifically, the present invention presents methods of addressing defocus and distortion issues in projected images, and particularly in images projected using reflector and/or refractor materials.

2. Description of Related Art

High resolution and high contrast projectors are increasingly used in a wide array of commercial and scientific applications, ranging from shape acquisition, to virtual environments and Imax© theaters. In vision and graphics applications, cameras are often combined with projectors to form a projector-camera, or ProCam, system, for creating so-called "intelligent projection systems". Previous work puts forth a vision of intelligent projection systems serving as novel tools for problem solving. Using pre-authored 3D models of objects, shader lamps have been used to add virtual texture and animation to real physical objects with non-trivial, complicated shapes. It is also possible to use space-time-multiplexed illumination in a ProCam system to recover scene depth. Nonetheless, many obstacles still remain to be overcome.

Like pinhole cameras, a projector suffers from limited field-of-view, i.e., it can be difficult to produce a panoramic projection using a single projector. One possible solution is to mosaic multiple projectors, and significant advances have been made in automatic mosaicing of multiple projectors. However, these systems typically require accurate geometric and photometric calibrating between the multiple projectors and a camera.

One approach toward facilitating accurate geometric and photometric calibration of a camera and an individual projector is drawn from an article by Sen et al., entitled "Dual Photography", published in the Proceedings ACM SIGGRAPH, 2005, which is herein incorporated by reference in its entirety. Dual photography makes use of Helmholtz reciprocity to use images captured with real cameras to synthesize pseudo images (i.e. dual images) that simulate images "as seen" (or effectively "captured") by projectors. That is, the pseudo image simulates a captured image as "viewed" by a projector, and thus represents what a projector-captured image would be if a projector could capture images.

Helmholtz reciprocity is based on the idea that the flow of light can be effectively reversed without altering its light transport properties. This reciprocity may be summarized by an equation describing the symmetry of the radiance transfer between incoming ($\omega i$) and outgoing ($\omega o$) directions as $fr(\omega i \rightarrow \omega o) = fr(\omega o \rightarrow \omega i)$, where fr represents the bidirectional reflectance distribution function (BRDF) of a surface.

Thus, dual photography ideally takes advantage of this dual nature (i.e. duality relationship) of a projected image and a captured image to simulate one from the other. Dual photography (and more precisely Helmholtz reciprocity) requires the capturing of the light transport property between a camera and a projector. More specifically, dual photography requires determination of the light transport property (i.e. light transport coefficient) relating an emitted light ray to a captured light ray.

When dealing with a digital camera and a digital projector, however, dual photography requires capturing a separate light transport coefficient relating each projector pixel (i.e. every emitted light ray) to each, and every, camera pixel (i.e. every light sensor that captures part of the emitted light ray), at the resolution of both devices.

Since images projected by a digital projector and captured by a digital camera can be represented as a matrix of data, creation of a light transport matrix T relating the digital projector to the digital camera would facilitate the use of dual photography, which brings the discussion back to the subject of catadioptric optical systems.

Catadioptric optical systems are typically associated with catadioptric telescopes and catadioptric cameras, but an object of the present invention is to create a catadioptric projector.

A second object of the present invention is to provide an omni-directional projection system that uses a single projector, as opposed to those that require multiple projectors.

Another object of the present invention is to improve images created by a catadioptric projector system.

SUMMARY OF INVENTION

The above objectives are met in a method for calibrating a digital projector to a digital camera, where the digital projector has an array of projector pixels and the digital camera has an array of sensor pixels. The method includes providing at least one processing unit to execute a series of steps including: (a) obtaining a light transport matrix correlating said array of projection pixels to said array of sensor pixels, said light transport matrix including a plurality of light transport data-sets each corresponding to a separate projector pixel within said array of projector pixels and consisting of light transport data as determined by means of the digital camera; (b) generating a blur kernel from the light transport matrix, where the blur kernel is indicative of projection blur, and the blur kernel is further comprised of a plurality of different defocus data-sets, each of the different defocus data-sets corresponding to a different projector pixel within the projector pixel array; and (c) for each input image to be projected by the digital projector: (1) multiplying the input image by the matrix inverse of said light transport matrix to create an intermediate transformed image; (2) applying deconvolution on said intermediate transformed image using the blur kernel to create a final image; and (3) submitting the final image for projection by the digital projector.

In this method, it is preferred that in step (b), each defocus data-set within the blur kernel is customized to its corresponding projector pixel.

Preferably step (b) of generating the blur kernel from the light transport matrix includes: for each projector pixel within the projector pixel array: (i) identifying a current projector pixel's corresponding light transport data-set within said light transport matrix; (ii) within the identified light transport data-set, identifying all nonzero light transport data entries; (iii) fitting a 2D (i.e. two-dimensional) Gaussian kernel to the identified nonzero light transport data entries to create the defocus data-set corresponding to the current projector pixel; and collecting all created defocus data-sets to form the blur kernel.

Further preferably in step (2), deconvolution (using the blur kernel), is applied on the intermediate transformed image using a steepest descent iterative method.

Alternatively in step (2), deconvolution is applied on the intermediate transformed image using the blur kernel by the following formulation, where p is the final image, c is the input image, T is the light transport matrix, G is the defocus kernel, D is a current state of a processed image during each iteration, projector pixel coordinates are identified as (r, s), and symbol ⊗ represents a convolution operation:

$$p = \arg\min\nolimits_D \{\|G \otimes D - (T^{-1} \cdot c)\|^2 \text{ and } \forall r, s \ 0 \leq D|r,s| \leq 255\}$$

In a preferred embodiment, the above formulation is achieved by defining $\hat{G}$ as a spatially varying kernel satisfying $\hat{g}[r, s] = \hat{g}[t-r, t-s]$, where t is the window size of the blur kernel, and repeating the following sub-steps using c for both $D_{in}$ and $D^0$ in an initial iteration:

(I) $R = \hat{G} \otimes (D_{in} - G \otimes D^n)$;

(II) update $D^n$ using $D^{n+1} = D^n + \alpha R$ where $\alpha = \{(\|R\|^2)/(\|G \otimes R\|^2)\}$, and individual pixel values within $D^{n+1}$ are clamped to between 0 and 255, inclusive, at the end of this step;

(III) compute the following difference for all pixels [r, s] in consecutive iterations of D by $$\sum_{p,q} |D[r, s]^{n+1} - D_{in}|$$

(IV) Repeat sub-steps (I) to (III) until the computed difference in step (III) is less than a predefined threshold. Preferably, this threshold is set to $\beta m^2$, where $m^2$ is the number of pixels of the desired image c and $\beta$ is a user definable constant between 0 and 1, exclusive. In the current best mode embodiment, $\beta$ is set to between 0.1 and 0.2, inclusive.

In a currently preferred embodiment, image D is arranged as a column signal vector, and G and $\hat{G}$ are two sparse matrices, and the convolution is formulated as matrix multiplication.

In step 1, above, in a preferred embodiment, creation of the matrix inverse of the light transport matrix includes imposing a Display Constraint upon the light transport matrix, where the Display Constraint specifies that any two distinct light rays emitted from the projector will hit the camera's image sensor at distinct parts, and wherein the imposing of the Display Constraint includes (for each row in light transport matrix T): comparing matrix entries along a common row of the light transport matrix, and nullifying by assigning zero values to all but the highest valued matrix entry in the common row, the resultant matrix being a modified light transport matrix T*. In this approach, the inverse matrix of the modified light transport matrix T* is preferably generated by: identifying in turn each column in the modified light transport matrix as a target column, calculating normalized values for not-nullified entry values in the target column with reference to the target column; creating an intermediate matrix of equal size as the modified light transport matrix; populating each column in the intermediate matrix with the calculated normalized values of its corresponding target column in the modified light transport matrix, each normalized value in each populated column in the intermediate matrix maintaining a one-to-one correspondence with the not-nullified entry values in its corresponding column in the modified light transport matrix; and applying a transpose matrix operation on the intermediate matrix. In this approach, the process of calculating normalized values for not-nullified entry values in the target column with reference to the target column consists of generating a sum of the squares of only not-nullified entry values in the target column and disregarding all nullified values in the target column, and dividing each not-nullified entry value by the above-described sum. In other words, if the intermediate matrix is denoted as $\check{T}$, a target column in modified light transport matrix T* is denoted as T*r and a corresponding column in $\check{T}$ is denoted as $\check{T}r$, then the construction and population of $\check{T}$ is defined as $\check{T}r = T*r/(\|T*r\|)^2$.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 1b is the dual-setup of the system of FIG. 1a.

FIG. 3a is a physical setup of a second catadioptric system in accord with the present invention.

FIG. 3b is a close-up view of the displayed image in the setup of FIG. 3a.

FIG. 9a is an example of a setup where the display constraint is violated.

FIG. 9b is the projection result of the setup of FIG. 9a with the display constraint being violated.

FIG. 9c is the projection result after imposing the display constraint on the setup of FIG. 9a.

DESCRIPTION OF THE PREFERRED EMBODIMENTS

The recent introduction and rapid adoption of consumer digital projectors has redefined the landscape for displaying images and videos. To model projection geometry, a projector-camera system (i.e. a ProCam system), can be setup and the projector can be treated as a virtual pinhole camera. Classical perspective geometry can then be directly applied to analyze the projection process.

Figure 1A:
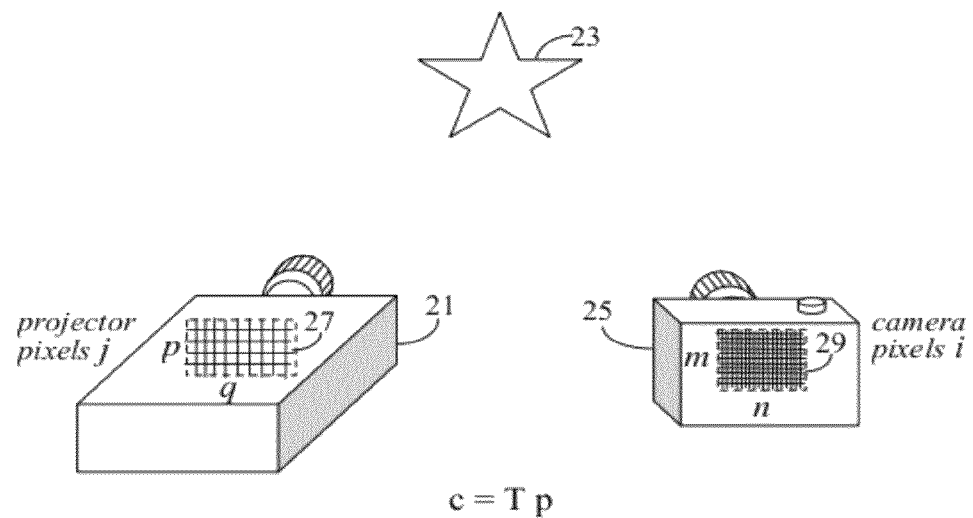
FIG. 1a is an imaging setup of a projector camera, ProCam, system.
Figure 1B:
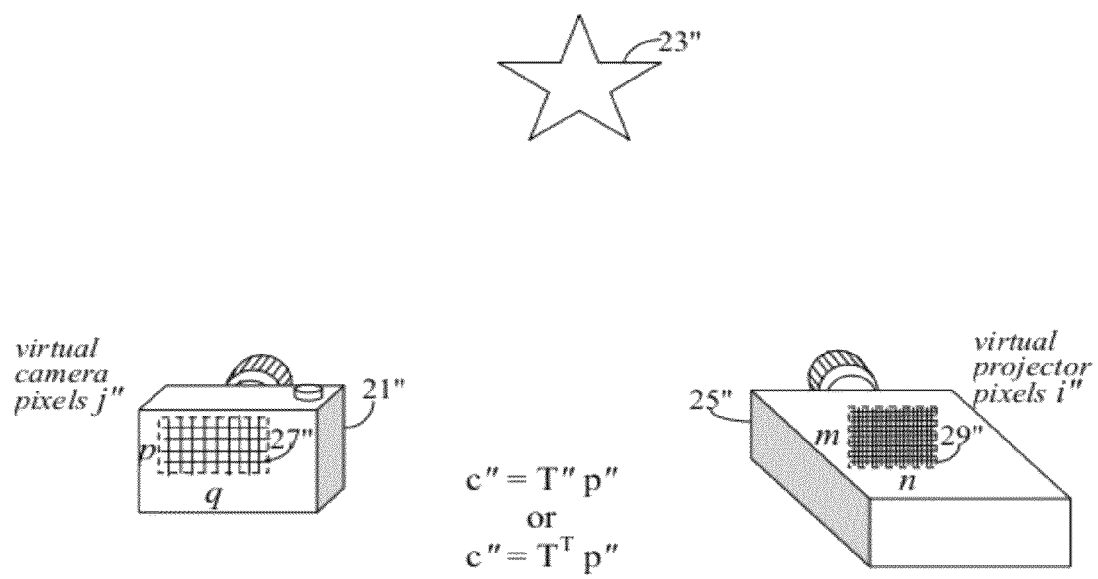

The basic construct of a projector-camera system can be better understood with reference to FIGS. 1a and 1b. In FIG. 1a, an imaging setup may include a real projector 21 and a real camera 25. Real projector 21 is preferably a digital projector and has an imaging element including an imaging projection array (i.e. projector pixel array 27), consisting of p rows and q columns of individual imaging projection elements (i.e. projector pixels j). Projector pixel array 27 is internal to real projector 21, but for discussion purposes, it is shown as crossed lines within a dotted square on projector 21.

Preferably, real camera 25 is a digital camera having an image sensor including a camera sensor pixel array 29 (i.e. light receptor array or image sensor array), consisting of m rows by n columns of individual camera pixels i (i.e. image sensor elements or light receptor pixels). For simplicity, camera sensor pixel array 29 is shown on real camera 25, but it is to be understood that camera sensor pixel array 29 is internal to real camera 25.

Light rays emitted from individual projector pixels j within real projector 21 form an image on a scene (i.e. projection surface) 23 by bouncing off the projection surface 23 (i.e. display environment or scene), which may have an irregular or flat shape, and some of the light rays eventually reach image sensor array 29 within real camera 25. In general, each light ray is dispersed, reflected, and refracted in the scene and hits the camera's image sensor at a number of different locations throughout image sensor array 29. Thus, when a single light ray emitted from an individual projector pixel j reaches real camera 25, the individually projected light ray forms an m-by-n image on camera sensor pixel array 29, with each individual camera sensor pixel i receiving a certain amount of light intensity contribution from the projected light ray.

Consequently, although it might appear that ideally a single light transport coefficient relating one projector pixel j to one camera pixel i might be determinable by individually turning ON a single projector pixel j to emit a single light ray to hit a single camera pixel i, this is not the case. In reality, the entire camera sensor pixel array 29 will receive a different contribution of light intensity from the individually emitted light ray. Therefore, each light ray emitted from each individual projector pixel j creates a different image (or light distribution) on image sensor array 29. In other words, each actuated projector pixel j generates a different set, or array, of individual light transport coefficients, one for each camera sensor pixel i within camera sensor pixel array 29. Consequently, each projector pixel's corresponding set (or array) of light transform coefficients will ideally consist of (m×n) [i.e. m-multiplied-by-n] individual light transport coefficients, one for each camera pixel i.

If each projector pixel's corresponding set of light transport coefficients is arranged as a column of coefficients to form a composite light transport matrix, T, then the composite light transport matrix T will have a different column of light transport coefficients for each individual projector pixel j. Furthermore, since there is a one-to-one correspondence between each light transport coefficient entry (i.e. matrix element) within each column and each camera pixel i, each column represents the entire image captured by camera 25 resulting from a single projector pixel j being turned ON. Accordingly, the entire (i.e. composite) light transport matrix T will consist of (p×q) [i.e. p multiplied-by q] columns (one column [i.e. captured image] for each individually turned ON projector pixel j) and (m×n) rows (one row for each individual camera sensor pixel i).

In the following discussion, it is beneficial to view a real projected image as a first vector, p, (i.e. real projection vector) having (p×q) elements (one for each projector pixel j), and a resultant real captured image as a second vector, c, (i.e. real captured image vector) having (m×n) elements (one for each camera pixel i).

If a real projected image (i.e. an image projected using the entire projector pixel array 27) is represented as a (p×q) real projection vector "p" (i.e. a "p-by-q vector"), and if its correspondingly captured real image (i.e. an image captured by the entire camera sensor pixel array 29) is represented as an (m×n) real captured image vector "c" (i.e. an "m-by-n vector"), then the light transport relationship between real projector 21 and real camera 25 can be written as $$c = Tp$$

where T is a composite light transport matrix that relates real projector 21 to real camera 25. It is to be understood that light transport matrix T would have been previously generated by, for example, individually and separately turning ON each projector pixel j and determining the corresponding light transport coefficient for each individual camera pixel i.

With reference to FIG. 1b, a "dual" setup is one where real projector 21 is replaced by a virtual camera 21" having a virtual camera sensor pixel array 27" of equal size as real projector pixel array 27. Thus, virtual camera 21" has a virtual camera sensor pixel array 27" comprised of p-rows by q-columns of virtual camera pixels j". Similarly, in this "dual" setup, real camera 25 is replaced by a virtual projector 25" having a virtual projector pixel array 29" of equal size as real camera sensor pixel array 29. Therefore, virtual projector 25" has a virtual projector pixel array 29" comprised of m-rows by n-columns of virtual projector pixels i".

In this case, a virtual image 23" (as projected by virtual projector 25") would be represented by an (m×n) virtual projection vector, p". Similarly, a virtually captured image captured by virtual camera 21" would be represented by a (p×q) virtual captured image vector, c". Therefore in this dual setup, virtual captured image vector c" relates to virtual projection vector c" by a "dual" light transport matrix T". By the principle of Helmholtz reciprocity, the light transport is equal in both directions. Therefore, the dual light transport matrix T" for the dual setup (i.e. the duality transformation setup) relates virtual captured image vector c" to virtual projection vector p" by following relation:

$$c'' = T''p''$$

This relationship, however, brings up the problem of how can one determine the multitudes of "virtual" light transport coefficients that make up dual light transport matrix T"? It has been found that a duality transformation from a real light transport matrix, T, to its dual light transport matrix, T", can be achieved by submitting the real light transport matrix T to a transpose matrix operation. Thus, T" is the transpose of T, such that $T'' = T^T$, and thus $c'' T^T p''$.

The present invention builds on the construct of FIG. 1a to address a new class of projection systems called catadioptric projectors. Below, it is shown that by combining a commodity digital projector with additional commodity optical units, one can create a catadioptric projector that offers an unprecedented level of flexibility in aspect ratio, size, and field of view.

Figure 2:
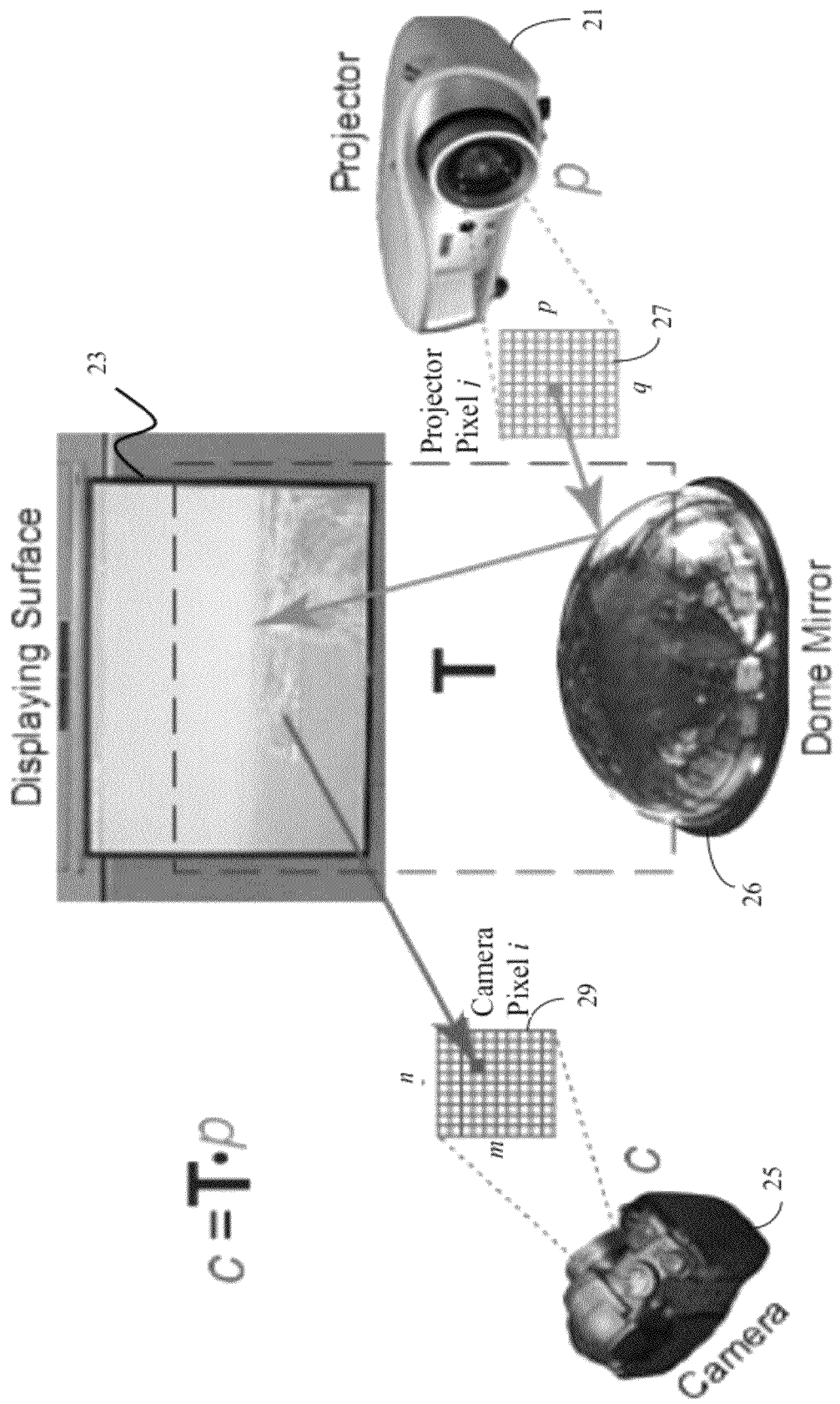
FIG. 2 is a physical setup of a first catadioptric system in accord with the present invention.

With reference to FIG. 2 (where all elements similar to those of FIG. 1a are identified by similar reference characters), a catadioptric projector (or catadioptric projector system) in accord with the present invention includes a digital projector 21, a scene area 23, and may use a digital camera 21 at least for initial setup purposes. Unlike the basic system of FIG. 1, the catadioptric projector of FIG. 2 further includes a light reflector or refractor optical unit (i.e., a dome mirror 25 in the present example).

Light emitted from any of projector pixels j from projector pixel array 27 is reflected or refracted by an optical unit (i.e. dome mirror 25) before reaching scene 23 (i.e. projection screen), and subsequently reaching image sensor pixels i within camera sensor pixel array 29. Light transport matrix T correlates each projector pixel j to a camera image (i.e. to sensor pixel array 29).

An alternate sample setup of the construct of FIG. 2 is shown in FIG. 3a, where the optical unit of FIG. 2 is in this example implemented as a curved plastic mirror 35. That is, like in the example of FIG. 2, the catadioptric projector of FIG. 3a also includes a digital projector 21 and an optical unit, but the optical unit is implemented as curved mirror 35. For ease of explanation, a monitor 37 displays the frontal view of curved mirror 35, which would typically face digital projector 21. FIG. 3b shows a close-up view of the image displayed on the scene (i.e. screen) 23 that uses the entire projector resolution, (1024×768 projector pixels) to display an image measuring 16 m×3 m on a wall.

Thus, catadioptric projectors in accord with the present invention assume unknown reflector and/or refractor geometry of the optical units and do not require accurate alignment between the projector and the optical units. In fact, everyday reflective and refractive objects such as plastic mirrors, commodity security domes, and even wine glasses may be used.

The complex geometry of the reflective and refractive objects can cause severe distortions, scattering, and defocusing. Herein are proposed several new algorithms to effectively reduce these artifacts without recovering the reflector and/or refractor geometry(ies). In the presently preferred embodiment, the light transport matrix (LTM) T between a projector and a camera is directly modeled. It is further shown that every two rows of LTM T from the projector to the viewpoint of the camera are nearly orthogonal. A simple method to approximate a pseudo inverse of LTM T is then shown, and applied to finding the optimal input image that produces least projections.

After discussing methods of simplifying the generation and manipulation of LTM T, as well as increasing the circumstances (i.e. environments) wherein LTM T may be practically used, the present invention presents a projection defocus analysis for mirror and thin refractor-based catadioptric projectors. It is shown that defocus blur can be interpreted as spatially-varying Gaussian blurs on an input image. After showing how (Gaussian) kernels can be directly measured from LTM T, it is explained how deconvolution may be applied to optimize the input image. Thus, practical uses of catadioptric projectors in panoramic and omni-directional projections are demonstrated. The presently preferred embodiment thereby achieves a wider field-of-view projection while maintaining sharpness and low geometric and photometric distortions.

To address the question of how to construct a catadioptric projector, it is helpful to reflect on catadioptric camera systems, which use curved reflectors to simulate a longer focal point and/or larger field-of-view. Thus, one may start by placing a virtual pinhole camera in front of specially shaped mirrors or reflectors to synthesize a wider field of view. Classical examples include single viewpoint catadioptric sensors based on hyperbolic or parabolic mirrors and multiple viewpoint sensors based on spherical, conical, and equiangular mirrors. Catadioptric cameras have also been used to capture high-resolution 360 degree or cylindrical panoramas. Most of these systems, however, require accurate alignment of the viewing camera. When the camera moves off focus, the reflection rays form complex caustic surfaces that are difficult to analyze.

Below is presented a catadioptric projector that combines a commodity projector with similar optical units used in catadioptric cameras. The key difference, however, is that the presently preferred embodiment does not require knowing or recovering reflector/refractor geometry. Instead, given a projector and a viewpoint (i.e. a desired image as viewed from the camera's viewpoint), the present approach is to compute a transformed image the projector should use to illuminate the scene in order to reproduce the desired image with minimal distortion. The problem is also addressed by studying how light propagates between the projector and the desired viewpoint (i.e. the camera's field-of-vision).

Modeling light transport through a known 3D environment is a well-studied problem in computer graphics. Consider emitting unit radiance along a light ray l towards a scene. The light ray l can be reflected, refracted, scattered, or simply pass through the scene. The full light transport $t_l$ can then be captured in response to the impulse illumination of l. Light transport $t_l$ may be referred to as the impulse scatter function, or ISF. The light transport for each incident ray can be measured, and all the light transport measurements can then be concatenated into a light transport matrix, or LTM, T. If the incident illumination is represented as $L_{in}$, then the outgoing light field can be expressed as a function of the illumination by $L_{out}=TL_{in}$.

To measure T, one can emit a 2D incident light field $L_{in}$ (i.e., an image) using a projector and capture the 2D (or 4D) outgoing light fields using a camera or a camera array. As is explained above, it has been shown that by the principle of Helmholtz reciprocity, the light transport can be used to model a 'dual' setup where the projector is replaced by a virtual camera and the camera by a virtual projector. This enables Dual Photography, where one can synthesize images that appear as though they were captured by the projector, with the scene illuminated by light emitting from the camera.

A goal of the present invention is to find the input image to the catadioptric projector that when used to illuminate the scene, allows the camera to capture a given desired view. This is an inverse light transport problem. A closed-form expression for computing the inverse LTM in a Lambertian environment is known, but for non-Lambertian environments, such as the ones used in the present catadioptric projector setup, the question of how to effectively approximate the inverse LTM remains an open problem.

As is shown in FIG. 2, a catadioptric projector combines a commodity digital projector 21 with additional optical units (such as a dome or curved mirror). The presently preferred embodiment uses specially shaped mirrors for synthesizing a wider field-of-view. This method is also used in catadioptric cameras, but catadioptric projectors differ from catadioptric cameras in several ways.

A first difference is the shape and size of the mirror used in the present catadioptric projector. In catadioptric cameras, it is often sufficient to use mirrors of approximately the same size as the lens (i.e., typically 35 cm in diameter) to synthesize a desired field-of-view. However, a projector uses a much bigger lens and has a longer focal length. Therefore to produce panoramic projections, it has traditionally been necessary to use larger sized mirrors (≈100 cm in diameter), which in the past typically had to be custom made.

In an effort to avoid the necessity for custom made components, the presently preferred setup may alternatively use a bent plastic mirror 35 to emulate a cylindric mirror (as illustrated in FIG. 3a) or may use a security dome 26 to emulate a spherical mirror (as illustrated in FIG. 2). The present embodiment may further use wine glasses to emulate thin refractors (as illustrated in FIG. 9a). One drawback to the present approach is that the surfaces of these inexpensive substitute components (i.e. plastic mirror, security dome, and wine glasses) are not perfectly polished and usually have micro-structures, such as bumps and dimples, that can lead to geometric distortion, scattering, and blurring.

A second way in which catadioptric projectors differ from catadioptric cameras is in their physical setup. In a catadioptric camera, the physical camera needs to be accurately positioned at the focal point of a hyperbolic or parabolic surface to synthesize a virtual pinhole camera. Hence, the physical camera, itself, will occupy the center part of the captured image. This does not cause much problem for catadioptric imaging as its goal is to capture the surrounding environment and the center portion of the image can be discarded especially if the physical camera is small. However, similar setups in a catadioptric projector can cause severe self-shadowing. Therefore, in the presently preferred setup, the projector is purposely moved away from the focal point of the mirror and is oriented so that the projector will not block the projected light path.

A third difference between catadioptric projectors and catadioptric cameras is that defocusing artifacts are more severe in catadioptric projectors than in catadioptric cameras. Most catadioptric cameras use a small aperture to increase the depth-of-field while projectors use large apertures to produce bright images. Additionally, since the virtual projector in a Dual Photography transformation of a catadioptric projector has more than one center of projection (COP), and typically has multiple COPs, while the physical, real projector can only set a uniform focal length, the final projection will exhibit spatially-varying defocus blurs.

The above-describe three differences each pose a different challenge. To resolve these challenges, novel algorithms for correcting projection distortions by modeling the light transport matrix between the real projector and real camera are first presented. The defocus mode in catadioptric projectors is then analyzed, and effective methods to minimize the defocus blur by pre-processing the input image are then developed. Several applications of the presently preferred system are then demonstrated.

First, the correcting of geometric and photometric distortions is addressed. Given a catadioptric projector and a viewpoint represented by a camera, one seeks to find the optimal image to be displayed by the projector so that it will be viewed with minimal geometric and photometric distortions from the viewpoint of the camera.

This brings up the subject of light transports in catadioptric projectors. As was discussed above in reference to FIGS. 1, 2, and 3a, it is presently assumed that the projector 21 has a p-row-by-q-column imaging element (i.e. projector pixel array 27) while the camera has an m-row-by-n-column camera sensor (i.e. camera sensor pixel array 29). Light rays emitted from the projector 21 bounce off the scene 23 and some of the light rays eventually reach the camera sensor pixel array 29. In general, each ray of light is dispersed, reflected, and refracted in the scene and hits the camera sensor pixel array 29 at a number of different locations. Thus the light ray passing through projector pixel j in projector 21 reaches camera 25 and forms an m-by-n image, where each camera pixel i receives a certain amount of light. If the image projected is represented as a p×q-element vector p and the image captured is represented as an m×n-element vector c, then the light transport between projector 21 and camera 25 can be written as $$c = Tp$$

where T is the light transport matrix (LTM).

The goal is to solve the inverse light transport problem, i.e., given the desired view c and LTM T, what should be the source image p. Intuitively, p can be found with $$p = T^{-1}c$$

provided one can determine $T^{-1}$. Thus, an aim of the present approach is to compute the inverse of the LTM T of the camera-projector pair. However, the sheer size of LTM T makes computing $T^{-1}$ an extremely challenging task requiring tremendous computational resources. Moreover, it is not always possible to find the inverse of an arbitrary matrix. Fortunately, as is shown below, for most practical settings, it is possible to find an approximation for $T^{-1}$ that can be efficiently computed.

Thus, the first step towards this aim is to identify a fast method of approximating $T^{-1}$, the inverse of LTM T. Recalling that the present approach assumes that in a typical projector-camera setup, any two distinct light rays l and k emanating from the projector will typically hit distinct regions of the camera sensor array, i.e., there will usually be little (or negligible) overlap in the camera pixels hit by light rays l and k. In the present discussion, this assumption is herein called the display constraint.

Furthermore, each column of light transport matrix T is the captured, projected image resulting from light-projection by one projector pixel j. Since the number of camera sensor pixels hit by one light ray emanating from one projector pixel (i.e. the light footprint created on the camera sensor array due to activation of one projector pixel) is small relative to the pixel-count of the camera sensor array, most column entries in the LTM T will have zero values. Only those column entries in LTM T corresponding to camera sensor pixels hit by light emanating from the corresponding projector pixel j (i.e. corresponding to the light footprint created by the activation of the corresponding projector pixel j) will have none-zero values.

By the display constraint, light from different projector pixels will mostly hit different camera pixels. This means that if two columns of LTM T are placed next to each other, the non-zero entries in the two columns will not line up in the row direction, most of the time. Thus, their dot product will be close to zero. This implies that the columns of T are mostly orthogonal to each other.

The display constraint assumes little overlap of light footprints created by adjacent projector pixels, which is dependent upon the scene. However, the display constraint may be imposed on a captured light transport matrix T, irrespective of the scene, prior to approximating the inverse of the captured light transport matrix T. To impose the display constraint, for each row in LTM T, one compares matrix entries along a common row of LTM T, and nullifies (by assigning zero values) all but the highest valued matrix entry in the common row. The resultant matrix is a modified light transport matrix T*.

Figure 4:
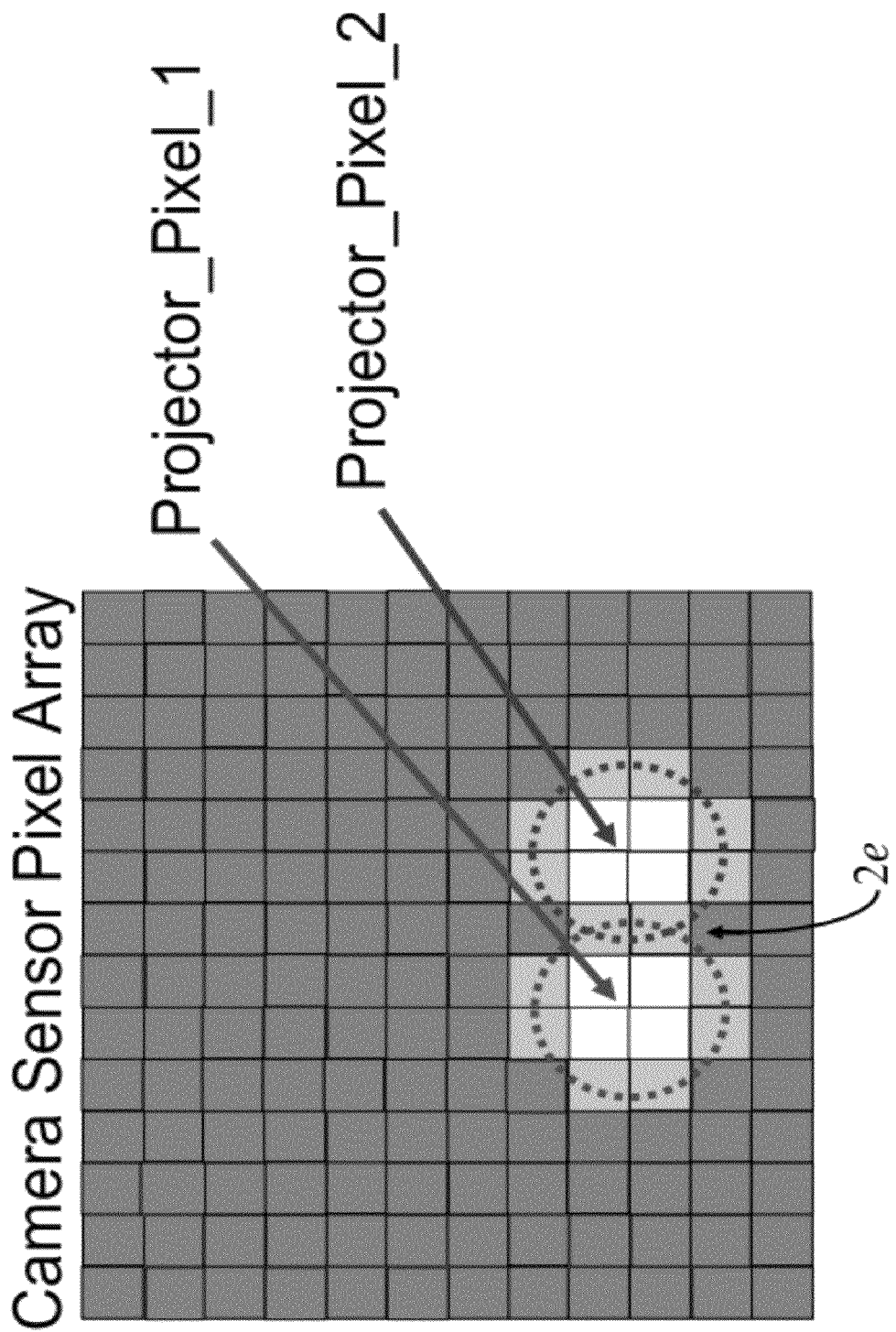
FIG. 4 is an example of two overlapping adjacent light footprints produced by two distinct projector pixels.
Figure 5:
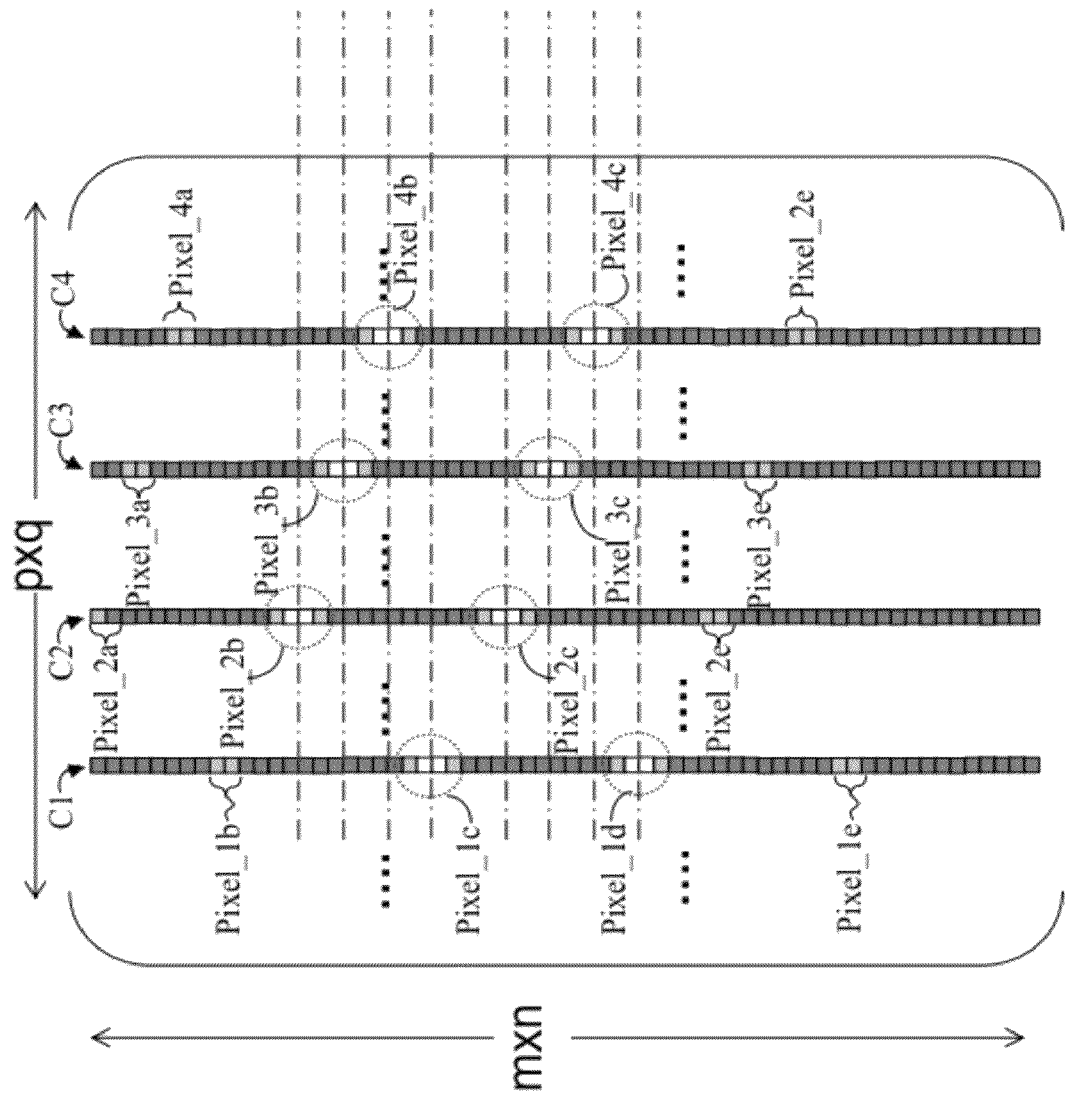
FIG. 5 is an example of a process in accord with the present invention for imposing a display constraint on an arbitrary scene.
Figure 6:
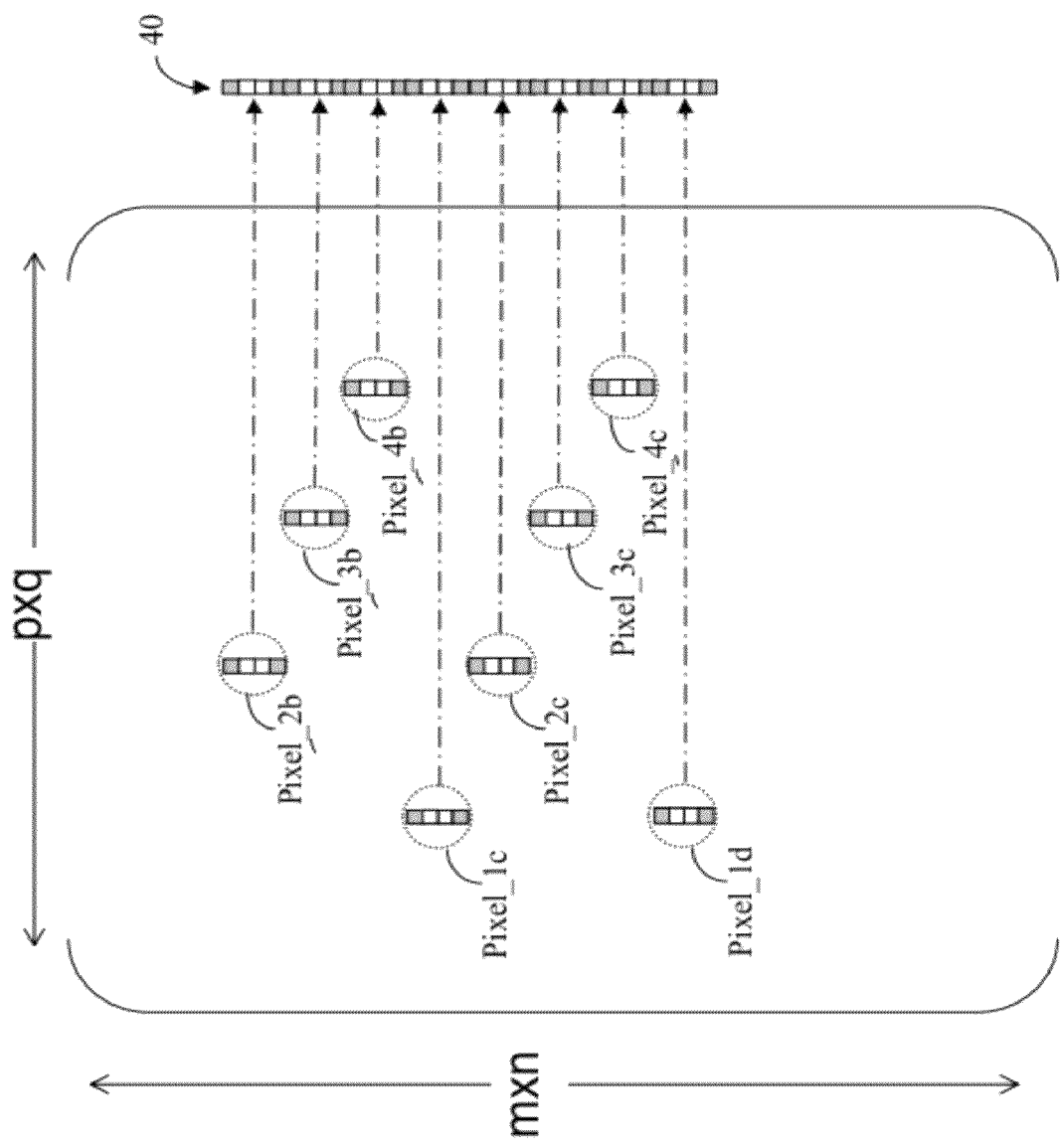
FIG. 6 is a further step in the imposing of the display constraint of FIG. 5.

This can be better understood with reference to FIGS. 4-6. Specifically with reference to FIG. 4, a first light footprint, Projector_Pixel_1, from a first projector pixel shares only two perimeter camera pixels 2e with an adjacent second light footprint, Projector_Pixel_2, from a second projector pixel. This means that if columns of a captured light transport matrix T are placed next to each other, the non-zero entries among the different columns will not line up most of the time (i.e. only the dimmer non-zero matrix entries will have some overlap, as illustrated by perimeter camera pixels 2e in the present example), and their dot product will be close to zero.

An example of this is shown in FIG. 5, where four exemplary columns C1 to C4 of a LTM T are shown adjacent each other. In column C1, circles Pixel_1c and Pixel_1d identify the brightest parts of a first light footprint (for example, the bright center of light footprint Projector_Pixel_1 in FIG. 4) that is recorded as an image within column C1. As shown, the full light footprint includes other less bright pixel groups Pixel_1b and Pixel_1e (that would constitute the less bright perimeter camera pixels of a light footprint, as shown in FIG. 4). However, for ease of explanation, only the brightest parts of each light footprint within each columns C1-C4 are identified by circles since the circles identify those pixel coefficient entries that will be retained in construction of a modified (i.e. estimated) light transport matrix T*.

As was shown in FIG. 4, the brightest part of any one light footprint generally does not overlap with the brightest part of any other light footprint. Thus, if the dimmer, perimeter camera pixels of a light footprint (i.e. pixel groups Pixel_1b and Pixel_1e in FIG. 5) are ignored to form a resized light footprint, then it can be assured that no overlap will exist between adjacent, resized light footprints.

Returning to FIG. 5, if one compares adjacent circled groups of pixels along adjacent columns, one will note that none of the circled pixels in adjacent columns overlap. For example, partial light footprint Pixel_1c in column C1 is offset in the horizontal direction from partial light footprint Pixel_2c in column C2, which in turn is offset from partial light footprint Pixel_3c in column C3, which is likewise offset from partial light footprint Pixel_4c in column C4, and so on. Similarly, none of the other bright partial light footprint circled sections (i.e. Pixel_1d, Pixel_2b, Pixel_3b, and Pixel_4b) line up with each other in the horizontal (i.e. row) direction.

Accordingly, the display constraint can be imposed on a captured LTM T if the dimmer perimeter camera pixels of a light footprint are ignored, and one creates resized light footprints consisting of only the brightest, center sections of the original light footprints. In this case, columns of LTM T become truly orthogonal to each other.

Thus, the orthogonal nature of captured LTM T may be assured by the way in which T is constructed in the above-described process for generating a modified LTM T*. Furthermore, the amount of memory necessary for storing T* is likewise reduced by storing only nonzero values (i.e. the brightest sections of light footprint) within each column, with the understanding that any matrix entry not stored has a zero value by default.

In the modified light transport matrix T*, this process is simplified because the nonzero values to be stored can be quickly identified by storing only the brightest value within each row of captured LTM T, which automatically creates resized light footprints. For example in FIG. 5, one may identify the brightest pixels along rows of LTM T (i.e. among adjacent image information corresponding to separate projector pixels and arranged in adjacent columns of LTM T) as is indicated by circles Pixel_1c to Pixel_4c, Pixel_2b to Pixel_4b and Pixel_1d.

If only the brightest valued entry within each row is retained, one obtains the structure of FIG. 6. The identified brightest sections may then be combined into a vector representation 40 of modified matrix T* (hereinafter light transform matrix T and modified light transport matrix T* may be used interchangeably, unless otherwise stated). As shown, vector representation 40 removes any overlap between adjacent columns of T by limiting itself to only the brightest camera pixel values within each row of T, and effectively imposes the display constraint on an arbitrary scene. Consequently, this construct of T is orthogonal, by design.

It is to be understood that to fully define modified light transport matrix T*, one only needs a second matrix column, or second array, to hold index information indicating which groups of partial light footprint sections belong to the same resized light footprint. In the present case, for example, groups Pixel_1c and Pixel_1d are part of a single resized light footprint corresponding to a first projector pixel. Similarly, light footprint sections Pixel_2b and Pixel_2c together form a second resized light footprint for a second projector pixel, and so on.

Whether one chooses to use the LTM T or the modified LTM T* (upon which the display constraint is imposed to assure that columns are orthogonal to each other), the approximation of the inverse of LTM T (or inverse of modified LTM T*) follows a similar procedure. For the sake of brevity, the present discussion assumes that one is using LTM T, directly.

To determine an approximation to the inverse of LTM T (i.e. to determine an approximation to inverse matrix $T^{-1}$), it is beneficial to first note that $AA^{-1}=I$, and that the identity matrix I is comprised of a matrix having entry values set to a value of "one" (i.e. 1) along a diagonal from its top left corner (starting at matrix location (1,1)) to its bottom right corner (ending at last matrix location (w,v)), and having entry values set to "zero" (i.e. 0) everywhere else. In order to compute $T^{-1}$, one first defines an intermediate matrix $\check{T}$ such that each column in $\check{T}$ is comprised of normalized values, with each column in $\check{T}$ corresponding to a column in LTM T (or equivalently, to a column in the modified light transport matrix T*). That is, $$\check{T}r = Tr/(\|Tr\|)^2, \; r=1, 2, 3, \ldots, pq$$

where $\check{T}r$ is the $r^{th}$ column of $\check{T}$ and pq is the total number of projector pixels in the projector pixel array, which preferably consists of p rows and q columns of individual projector pixels. Since matrix operation $\|Tr\|$ defines the square root of the sum of the squares of all values in column r of LTM T, the square of $\|Tr\|$ is simply the sum of the squares of all the values in column r. That is, $$(\|Tr\|)^2 = \left\{ \sum_{\varepsilon=1}^{\varepsilon=g} (Tr_\varepsilon)^2 \right\}$$

By dividing each value entry in column r by the sum of the squares of all the values entries in column r, operation $\{Tr/(\|Tr\|)^2\}$ has the effect of normalizing the value entries in column r of matrix T. If one now takes the transpose of $\check{T}r$, i.e. flips it on its side such that the first column becomes the top row and the last column becomes the bottom row, the result will be rows of elements that are the normalized values of corresponding columns of elements in T. Therefore, for every column in T, one has the following result:

$$(\check{T}r^T) \times (Tr) = 1$$

and $$(\check{T}r^T) \times (T\omega) = 0, \text{ for } r \neq \omega$$

In other words, multiplying a column of T with a corresponding row in $\check{T}r^T$ always results in a value of 1, and as one multiplies all the columns in T with the corresponding row in $\check{T}r^T$, one produces a matrix with numeral 1's along its diagonal, and one may place zeroes everywhere else to fully populate the produced matrix.

Therefore, in the case of LTM T, where columns are (or are made) orthogonal to each other, and given the specific construction of intermediate matrix $\check{T}$, it has been shown that the transpose of $\check{T}$ is equivalent to (or is a good approximation of) the inverse of LTM T (or the inverse of modified LTM T*). This means that $$\check{T}^T \approx T^{-1} \text{ and } p \approx \check{T}^T c$$

Note that the approximation to the inverse of LTM T can only applied to the projector pixels whose emitted light actually reached the camera's sensor array. For the projector pixels whose emitted light never reach any of the camera sensor pixels, the corresponding columns in LTM T will be all zeros, and the above-given equation for normalizing each column of LTM T would be un-defined. In these cases, one may set the corresponding columns in intermediate matrix $\check{T}$ to zero columns. Thus $\check{T}^T$ is the inverse of the part of T that covers the overlapping area of the fields-of-views (FOV) of the projector and the camera. It only recovers the projector pixels in p that fall in the overlapping FOV and blacks out other projector pixels. Once $\check{T}^T$ is computed, it can be directly applied to the target image c to find the optimal projection image p (i.e. p=$\check{T}^T$ c).

In the following discussion, matrix $\check{T}^T$ is called the View Projection matrix, such that given a desired view c, one can find an image p defined as p=($\check{T}^T$c) such that projecting image p produces a scene which, when viewed from the view point of the camera, has the same appearance as c. Since $\check{T}^T$ is effectively an approximation of inverse matrix $T^{-1}$ (or a modified version of matrix $T^{-1}$ created by imposing upon it the display constraint) and is used as such herein, for the rest of the following discussion inverse matrix $T^{-1}$ and View Projection matrix $\check{T}^T$ may be used interchangeably, unless otherwise indicated. In this case, it is to be understood that the symbol $T^{-1}$ generally represents the inverse of both the unmodified and the modified (i.e. approximated) forms of the light transport matrix T since its modification may be optional.

To acquire LTM T, an approach described in co-pending application Ser. No. 12/412,244 entitled Small Memory Footprint Light Transport Matrix Capture assigned to the same assignee as the present application and hereby incorporated by reference in its entirety, is preferably adopted. This approach activates (i.e. turns ON) only one row or one column of the projector pixels at a time with a white color of intensity of 255 to create a one-row image or one-column image, respectively, of each row or column of the projector pixel array. The camera individually captures each of the projector's one-row images and one-column images. Since in the present embodiment, it is assumed that the camera is of equal or higher resolution than the projector's resolution, each projected one-row image is captured by the camera as a corresponding camera-row-set image consisting of one row of camera pixels with captured non-zero light transport values (if the camera's resolution is close to or equal to the projector's resolution) or consisting of multiple adjacent rows of camera pixels with captured nonzero light intensity values (if the camera pixel resolution is twice or more the projector's pixel resolution). Similarly, each projected one-column of projector pixels is captured by the camera as a camera-column-set image consisting of one column of camera pixels with captured non-zero light intensity values (if the camera's resolution is equal to or close to the projector's resolution) or consisting of multiple adjacent columns of camera pixels with non-zero captured light transport values (if the camera's pixel resolution is twice or more the projector's pixel resolution). This process is repeated until the camera has captured a camera-row-set image of every projected row in the projector pixel array, and captured a camera-column-set image of every projected column in the projector pixel array. For discussion, within each camera-row-set image, camera sensor pixels that capture light emanating from a projected row of projector pixels are identified as non-ambient (or nonzero, NZ) pixels since they capture a nonzero light intensity value, and camera pixels that do not capture light emanating from a projected row are identified as zero pixels. Similarly within each captured camera-column-set image, camera sensor pixels that capture light emanating from a projected column of projector pixels are identified as non-ambient (or nonzero, NZ) pixels, and camera pixels that do not capture light emanating from a projected column are identified as zero pixels.

For each projector pixel $j_{(r,s)}$, (identifying a projector pixel having coordinates (r,s) within the projector pixel array 27), the common non-ambient (i.e. nonzero or NZ) camera pixels in the $r^{th}$ camera-row-set image and the $s^{th}$ camera-column-set image are brightened by projector pixel $j_{(r,s)}$. The coordinates of the non-ambient camera pixels common to both the $r^{th}$ camera-row-set image and the $s^{th}$ camera-column-set image, determine the indices of the nonzero values in the column of LTM T corresponding to projector pixel $j_{(r,s)}$, and the actual nonzero light transport values may be acquired as the average colors (or alternatively as the dimmer) of these individual, common camera pixels over the two images. This process goes through all pairs of projector one-row and projector one-column images, and LTM T is thereby acquired in its entirety.

Returning now the subject of catadioptric projectors, as a first example, FIG. 2 shows a dome catadioptric projector (i.e. one using a spherical-like mirror) that includes dome mirror 26 in addition to commodity projector 21, commodity camera 27, and projection scene area 23. As is explained above, projector 21 includes an array 27 of projector pixels and camera 21 includes an array of camera sensor pixels 29.

Since the present embodiment seeks to provide an affordable catadioptric projector, dome mirror 26 is not an ideal spherical mirror, and is preferably implemented using a commodity security dome. Unlike an ideal spherical mirror, the geometric distortions caused by dome mirror 26 are non-uniform due to micro-structures on the mirror, such as bumps and dimples. They also introduce additional photometric distortions like inter-reflection. Additionally, since the dome mirror 26 used in the present embodiment is not perfectly specular, the center of the projection can be observed to be brighter than the boundary. If one were to project an image directly using dome mirror 26 without any light transport correction, one would observe geometric distortion, such as stretching and shearing of patterns in a final projection.

Figure 7A:
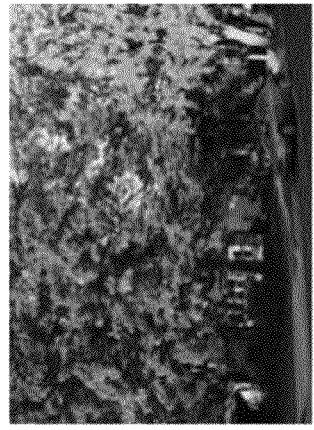
FIGS. 7a-7d are a first set of examples of projecting an image with and without light transport correction.
Figure 7B:
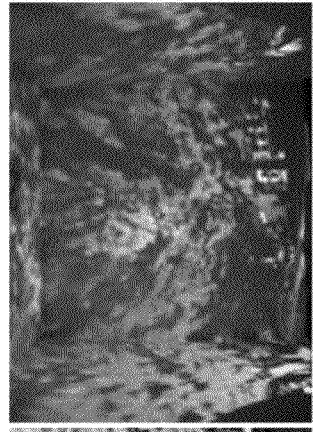
Figure 7C:
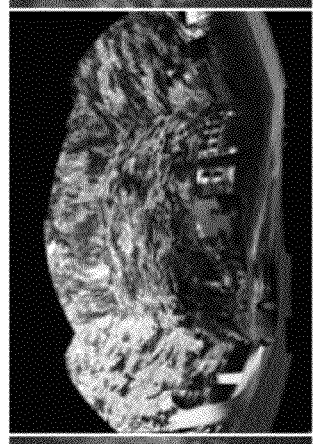
Figure 7D:
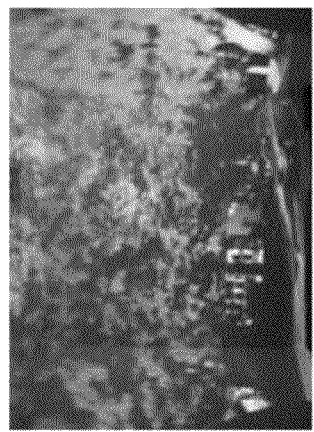

Two sets of examples of two projected images with and without light transport correction are shown in FIGS. 7a-7d and in FIGS. 8a-8d. FIG. 7a shows a desired image, i.e. how an image should ideally look after projection. FIG. 7b shows the actual, resultant, image if the image of FIG. 7a were projected directly on dome mirror without pre-correction. As can be observed, the resultant image suffers from much distortion. However, the inverse LTM T approximated by the present approach significantly reduces both geometric and photometric distortions. Image 7c shows a transformed image, as projected after light transport correction, and FIG. 7d shows the resultant image as projected on three walls after light transport correction.

Figure 8A:
FIGS. 8a-8d are a second set of examples of projecting an image with and without light transport correction.
Figure 8B:
Figure 8C:
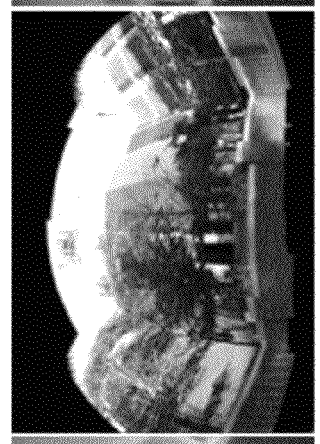
Figure 8D:

Similarly, FIG. 8a shows a desired image. FIG. 8b shows a resultant projected image if the image of FIG. 8a is projected without light transport correction. FIG. 8c shows the image of FIG. 8a after being transformed by light transport correction, and FIG. 8d shows the final image as projected onto three walls after light transport correction. As is evident from FIGS. 7d and 8d, corrected image addresses much of the geometric distortion, but still suffers from defocus issues. This problem is addressed below in more detail.

In general, the display constraints may be violated if there is significant scatter in the light path to a projection scene. An example of this is demonstrated in a reflector experiment shown in FIGS. 9a-9c, where a pair of wine glasses 41 is placed between projector 21 and projection scene 23. In FIG. 9a, a pattern stating "CVPR 09" is projected through a pair of thin wine glasses 41. The final projected image without light transport correction, as is shown in FIG. 9b, exhibits severe photometric distortions and geometric distortions, e.g., scattering artifacts around the boundaries of the wine glasses. Furthermore, since the refracted rays form caustics, uneven brightness across the displayed image can be observed. However, since the light transport matrix T captures both scattering and caustics, these artifacts are significantly reduced after light transport correction using the approximated LTM T, as is shown in FIG. 9c.

This approach, however, does not compensate for shadows caused by occlusions. Notice that near the occlusion boundaries of the wine glasses, the incident rays reach the grazing angle. The transparent glasses hence behave like opaque objects near the boundary and cast shadows on the final projection. It is conceived that combining multiple projectors may be used to remove the shadows.

The present light transport model assumes that each pixel from the projector is a single light ray. This corresponds to a small aperture model, but in practice, projectors use large apertures to produce bright images and multiple light rays may pass through the same projector pixel. Ideally, one should preferably use a 4D incident light field, rather than the currently used 2D image, to model the LTM T. Therefore, the inverse LTM of the current embodiment has difficulty correcting visual artifacts caused by the 4D incident light field, such as projection defocus artifacts.

Below is presented a solution for modeling projection defocusing. In the presently preferred embodiment, it is assumed that projection blur can be equivalently interpreted (i.e. modeled) as first blurring the input image by a blur kernel G and then transporting the blurred image by LTM T. This assumption model will be validated in both the reflection and refraction cases. The final light transport from the projector to the camera be then written as:

$$c = T^* \cdot p = T \cdot G \cdot p$$

where T* is the captured light transport image that includes projector defocus, G is the blur matrix, and T is the light transport matrix based on the small aperture model. The optimal input image p, hence, can be computed as:

$$p = T^{*-1} \cdot c = G^{-1} \cdot T^{-1} \cdot c$$

To compute $T^{-1}$, it is assumed that the display constraint is still satisfied if G is applied on T. Therefore, the inverse LTM algorithm, described above, can be applied on the captured T* matrix to obtain $T^{-1}$. That is, in the case of defocus in a catadioptric projector, the captured LTM T* is used as an approximation of the LTM T that is based on the small aperture model. Next, the problem of how to compute $G^{-1}$ is addressed.

Figure 10:
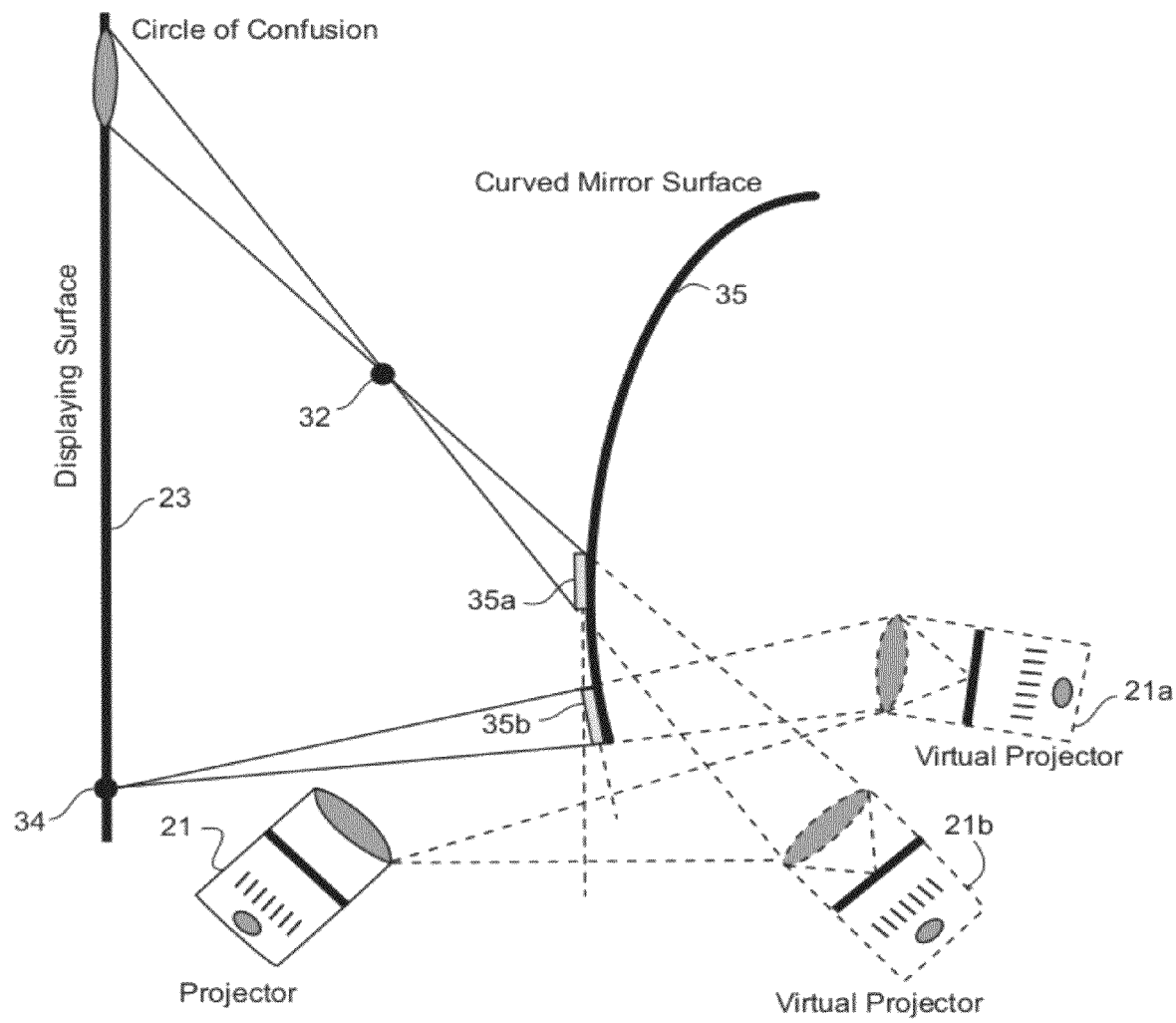
FIG. 10 is an example of a cause of projection defocus in reflector-based catadioptric projectors.

First, the cause of projection defocus in reflector-based catadioptric projectors is analyzed with reference to FIG. 10. Given a projector 21 and an optic unit (such as curved mirror 35 in the present example), one can first approximate the mirror 35 as a series of piecewise linear (PL) surfaces, or planar patches (only two planar patches 35a, 35b are shown for convenience). For each planar patch 35a/35b, the physical projector 21 is mapped to a corresponding virtual pinhole projector 21a/21b using reflection geometry. Hence, the catadioptric projector can be treated as a locus of virtual pinhole projectors 21a/21b.

If specially shaped reflectors are used as the optical unit, such as hyperbolic or parabolic mirrors, and physical projector 21 is positioned at the focal point, all virtual projectors 21a/21b will lie at the same center of projection, COP. To minimize projection defocus, the focal plane of the virtual projectors 21a/21b can be set close to the display screen 23. For general mirrors, the loci of virtual projectors 21a/21b correspond to complex caustic surfaces. This implies that the virtual projectors 21a/21b will lie at different depths with respect to the display screen 23 and thus have different focal points, 32 and 34, for example. Since physical projector 21 can only have a single focal point, the virtual projectors 21a/21b will produce spatially-varying projection blurs.

Figure 11A:
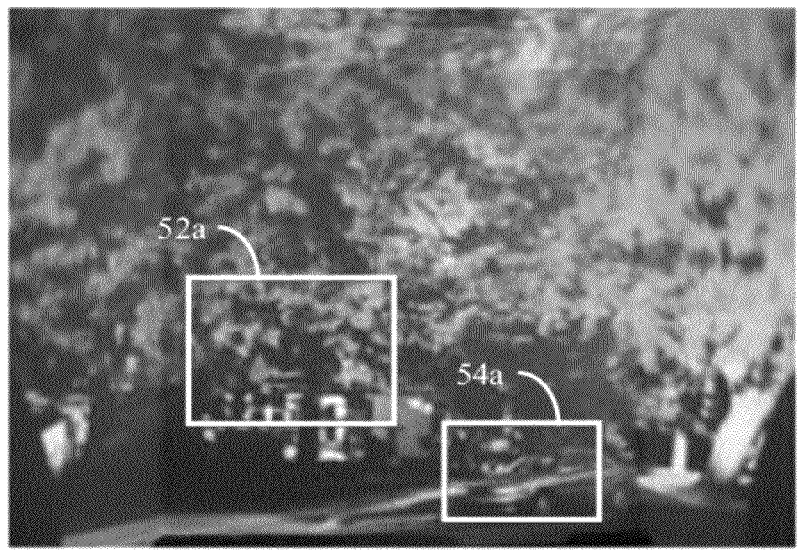
FIGS. 11a-11c illustrate spatially-varying projection blurring.
Figure 11B:
Figure 11C:

A first example of this type of spatially-varying projection blurring is shown in FIGS. 11a to 11c. FIG. 11a is a projected image after application of light transport compensation correction. Larger square 52a and smaller square 54a identify areas where defocus effects may be observed. FIG. 11b is a larger view of the area inside larger square 52a, and FIG. 11c is a larger view of the area inside smaller square 54a. The blurring effects within squares 52a and 52b are more evident in the views of FIGS. 11b and 11c.

Figure 12A:
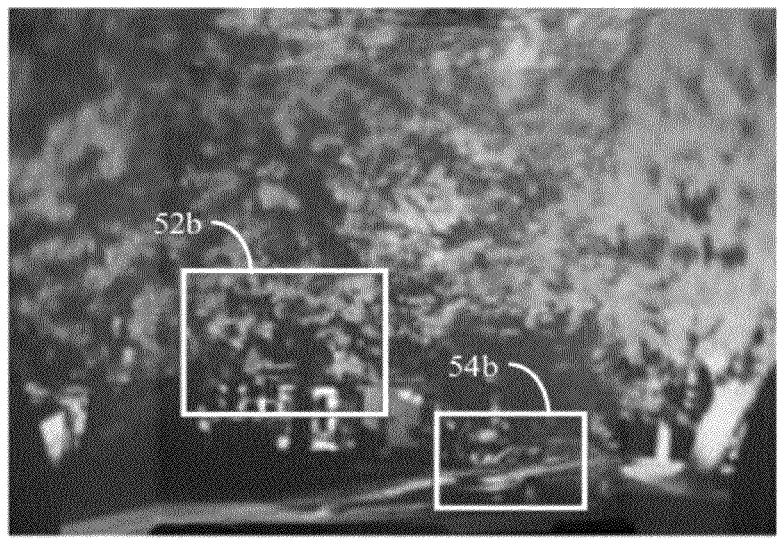
FIGS. 12a-12c show the results of applying the present defocus compensation on the images of FIGS. 11a-11c.
Figure 12B:
Figure 12C:

A method for applying defocus compensation on an image after it has received light transport compensation correction is explained below. FIGS. 12a to 12c, however show the results of applying the present defocus compensation on the images of FIGS. 11a-11c. FIG. 12a is the image of FIG. 11a after it has further undergone the below-described defocus compensation. Larger squares 52b and smaller square 54b in FIG. 12a, corresponding to squares 52a and 54a of FIG. 11a. FIGS. 12b and 12c provide larger views of squares 52b and 54b, respectively.

Returning now to FIG. 10, assuming that each virtual pinhole projector 21a/21b can be viewed as a virtual camera, the presently preferred embodiment treats projection defocus as a "circle-of-confusion" 28 of virtual cameras. Although only one circle-of-confusion 28 is shown in FIG. 10, it is to be understood that each virtual projector (i.e. 21b) whose focal point (i.e. 32) does not lie on display screen 23 would contribute to a corresponding circle-of-confusion. In the presently preferred embodiment, it is assumed that the reflector (i.e. curved mirror 35 in the present case) is highly smooth and the projection screen 23 is nearly parallel to the image plane of the virtual projectors 21a/21b. These assumptions permit spatially-variant Gaussian blurs to be used to approximate the blur kernels.

To acquire the kernel size, one can project dotted patterns and capture their defocused images. In the above-described method of acquiring light transport matrix T, the nonzero terms in LTM T are a mixture of projection defocus and light transport data (e.g., inter-reflections). For curved mirrors (including dome mirrors), it preferably assumed that these non-zero terms are dominantly caused by defocus. Therefore, the presently preferred embodiment reuses the captured light transform matrix T* for estimating the blur kernels.

Figure 13:
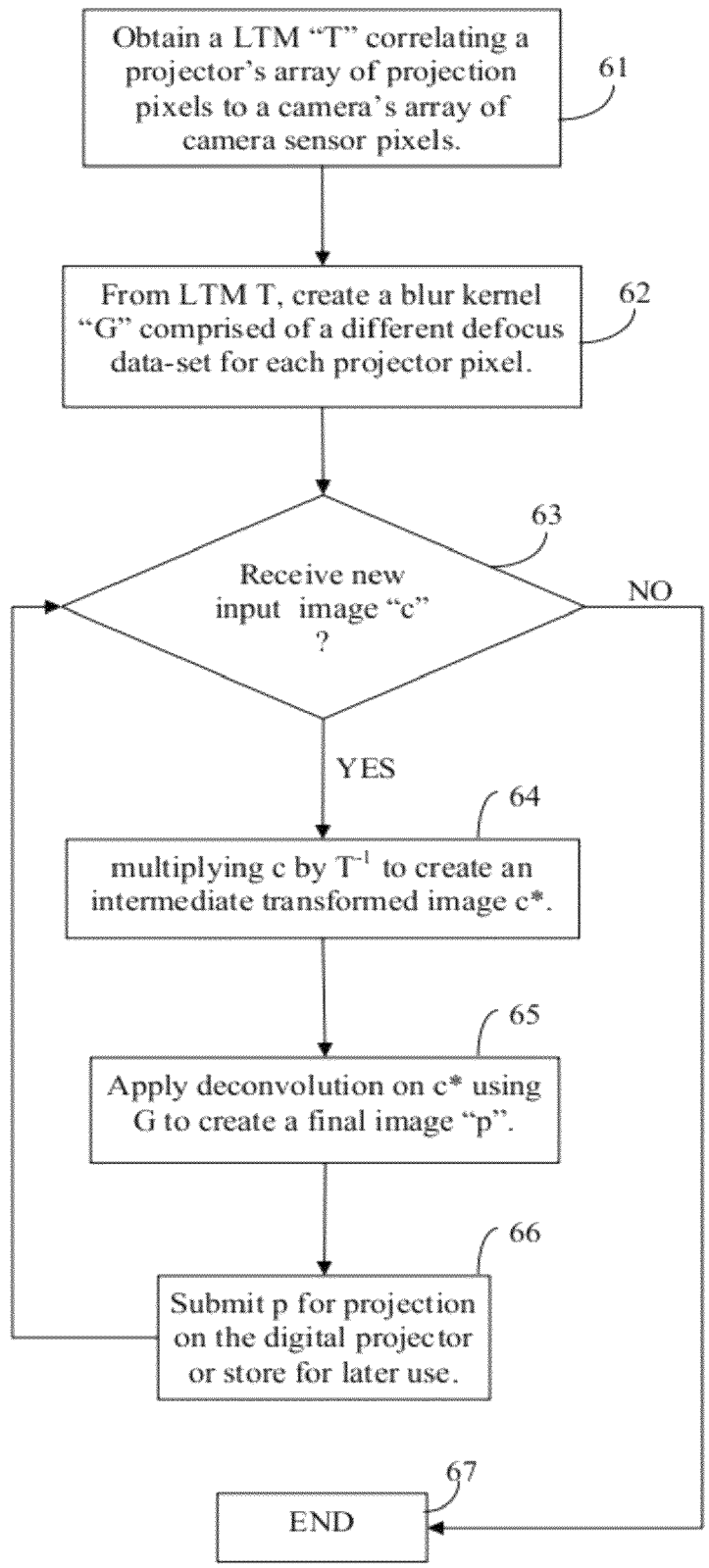
FIG. 13 is a flowchart illustrating the application of defocus compensation in accord with the present invention.

With reference to FIG. 13, the first step 61 is therefore to obtain LTM T, which can be captured light transport matrix T* obtained through any of the above-described methods including the approximation of LTM T obtained by imposing the display constraint. From LTM T, one can create blur kernel G (step 62), where G is a matrix comprised of a different defocus data-set for each projector pixel. That is, each projector pixel j has a distinct data-set in a corresponding column in matrix G generated from the same projector pixel's corresponding column in LTM T.

The following steps are then repeated for each received input image c, and the process does not end (step 67) until the last input image c is received (step 63). Received input image c is multiplied by $T^{-1}$ (i.e. the inverse of LTM T) to create an intermediate transformed image c* (step 64). Deconvolution is then applied on intermediate transformed image c* using defocus kernel G to create final transformed image (step 65), which when projected should reproduce desired image "p". This final transformed image "p" is then submitted to the projector for projection, or stored for later use (step 66).

Figure 14:
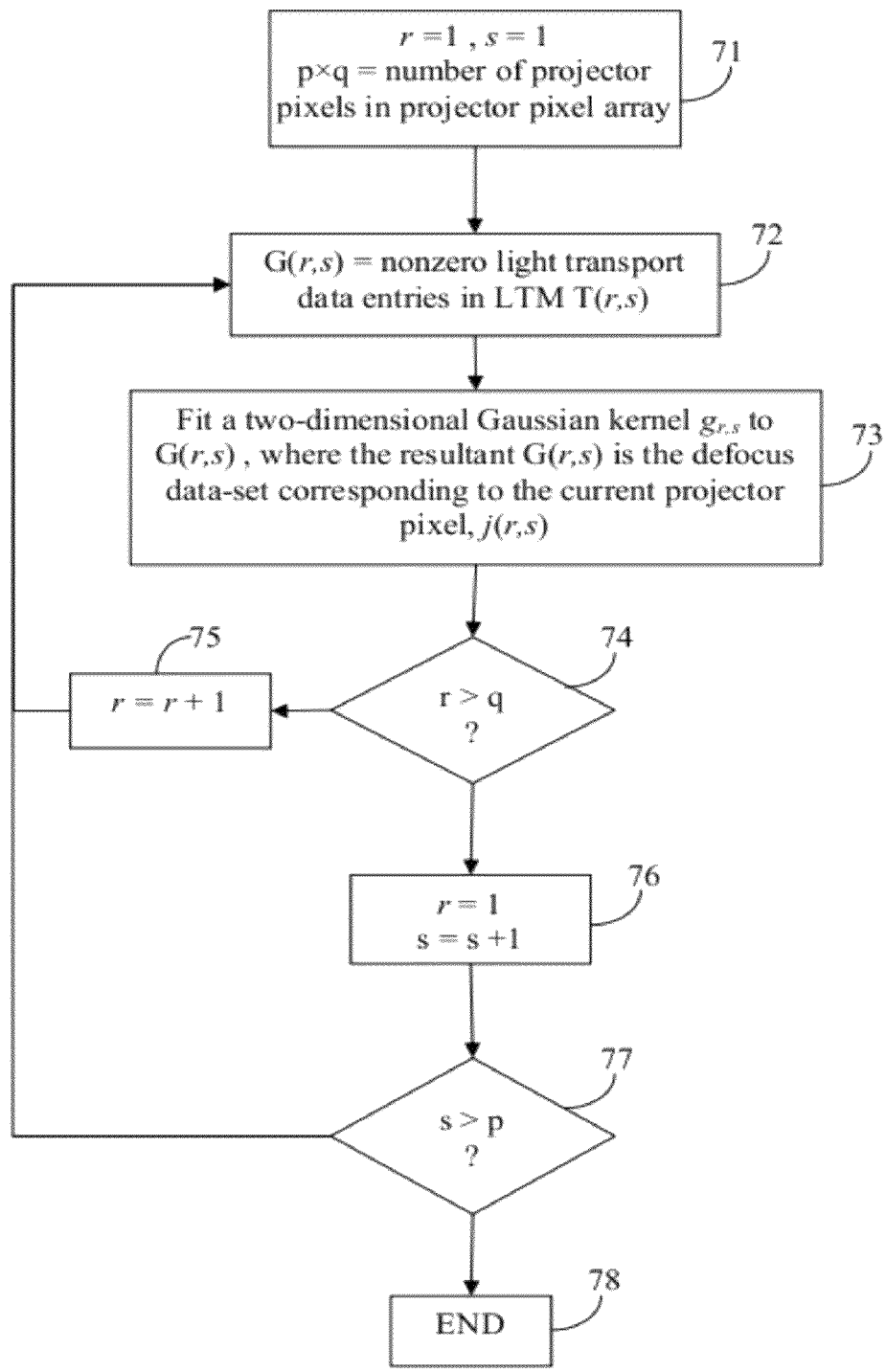
FIG. 14. is a flowchart illustrating a preferred method of implementing step 62 of FIG. 13.

A description of the preferred method of implementing step 62 of FIG. 13 (i.e. the creating of blur kernel (or defocus kernel) G from LTM T) is shown in FIG. 14. Step 71 sets variable r and s to point to the first matrix location in both G and T (i.e. set (r,s) to location (1,1)). Steps 74 and 75 increment r from column to column along a row, until r reaching the end of a current row at the last column location (r=q), at which point r is reset back to the first column location at r=1 (step 76). Value s is then incremented to point to the next row in the matrices (step 76). This sequence is repeated until s has reached the last row in the matrices at location p (step 77) at which the process ends (step 78). It is to be understood that this sequence is for illustration purposes, and that the objective is to cycle through all matrix locations in T and G, and that any sequence for achieving this will suffice.

Thus, for every projector pixel $j_{(r,s)}$ (steps 71 and 74-78), the non-zero terms in its corresponding column in LTM T* are first computed. Basically, this means that once LTM T (or equivalently T*) has been acquired, matrix G is populated by copying the nonzero light transport values in each column of T to a corresponding column in G (step 72). A 2D Gaussian kernel $g_{r,s}$ is then fitted to each column in G to create a separate data-set for each projector pixel j (step 73).

Once the defocus kernel G and the inverse LTM $T^{-1}$ are obtained, the process returns to step 63 of FIG. 13, and continues as described above. That is, the input image c is first multiplied by inverse LTM $T^{-1}$ to create intermediate transformed image c* (step 64). Deconvolution is then applied on intermediate transformed image c* using defocus kernel G (step 65). In the presently preferred embodiment, a steepest descent approach is adopted.

Figure 15:
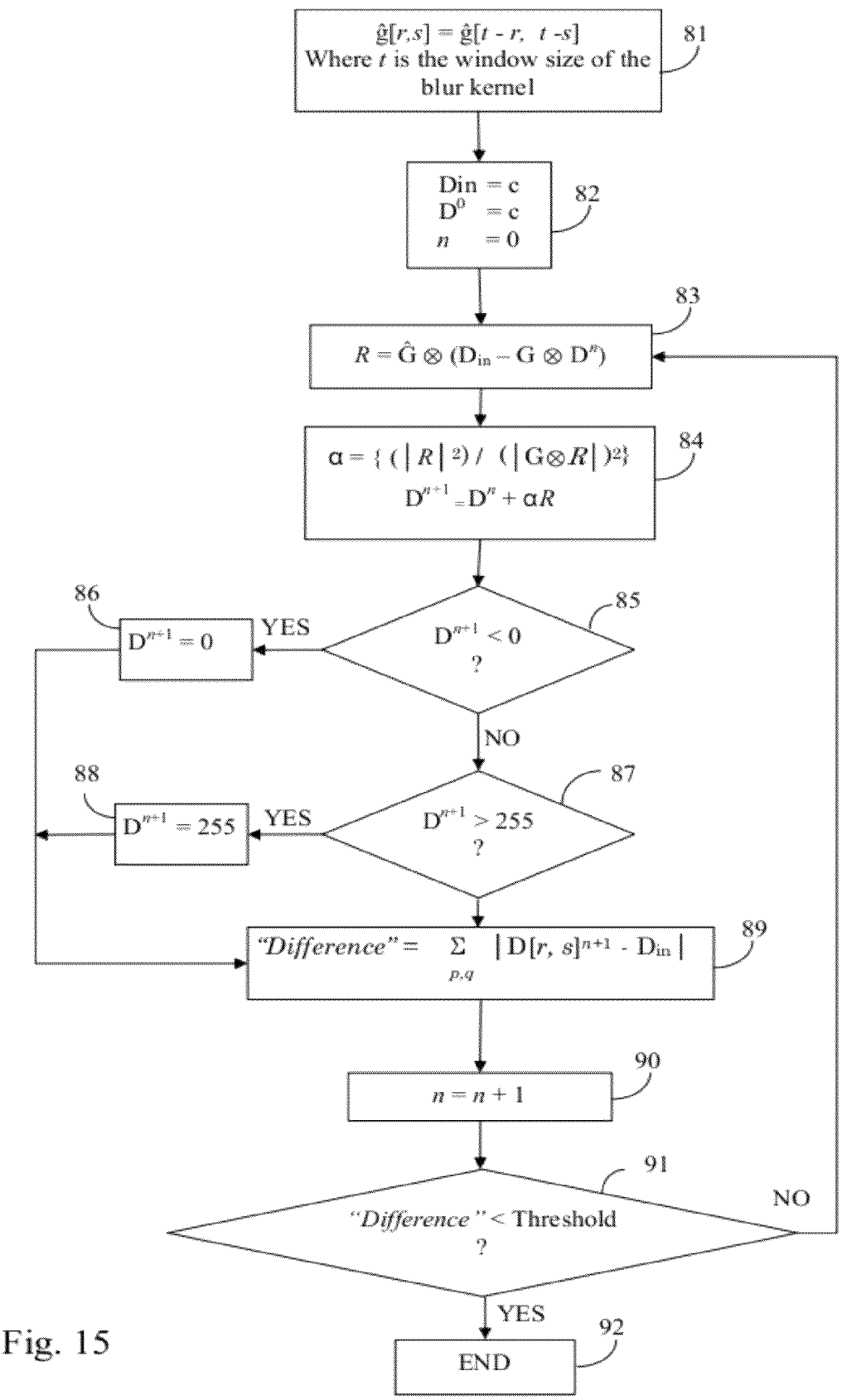
FIG. 15 is a flowchart illustrating a preferred method of implementing step 73 of FIG. 14.

One method of fitting the 2D Gaussian kernel $g_{r,s}$ to G (i.e. step 73 in FIG. 14) is shown in FIG. 15. Basically, for every projector pixel $j_{(r,s)}$, the non-zero terms in its corresponding column in the light transform matrix T (or row in inverse light transport matrix, $T^{-1}$) are computed and fitted to the 2D Gaussian kernel $g_{r,s}$. A goal of the present approach is to find the optimal image that appear least defocused. This can be understood as follows:

$$p = \arg\min_s \{\|G \otimes D - (T^{-1} \cdot c)\|^2 \text{ and } \forall r, s \ 0 \leq D\|r, s\| \leq 255\}$$

Where symbol $\otimes$ is a convolution operator

A key point to be made here is that the defocus blur is applied to $(T^{-1} \cdot c)$ instead of the source image c. Preferably, the steepest descent method is used to approximate a nearly optimal D, where D is a current state of a processed image during each iteration. Further preferably, the desired image c is used as the initial guess D0 as well as Din during an initial iteration (step 82), and the following three steps are repeated:

Firstly (step 83), compute the residue R as:

$$R = \hat{G} \otimes (D_{in} - G \otimes D^n)$$

where $\hat{G}$ is a spatially varying kernel satisfying $\hat{g}[r, s] = \hat{g}[t-r, t-s]$, and t is the window size of the blur kernel (step 81). The image D is columnized as a single vector (i.e. arranged as a column vector), and G and $\hat{G}$ are used in sparse matrices format, directly. The convolution can then be formulated as matrix multiplication.

Secondly (step 84), update Dn using the steepest descent approach, as $$D^{n+1} = D^n + \alpha R \text{ where } \alpha = \{(|R|^2)/(|G \otimes R|)^2\}$$

Where (as illustrated in steps 85-88) $D^{n+1}$ is clamped to [0, 255] at the end of step 84. $D^{n+1}$ is the current state of a processed image during each iteration, and the individual pixels are clamped between 0 and 255.

Thirdly, compute the sum of absolute differences for all projector pixels j(r, s) in consecutive iterations of D (step 89) by:

$$\text{Difference} = \sum_{p,q} |D[r, s]^{n+1} - D_{in}|$$

Step 83-89 are repeated until the above-determined "Difference" in step 89 is less than a predefined threshold (steps 90, 91, and 92). Preferably, this threshold is set to $\beta m^2$, where $m^2$ is the number of pixels of the desired image c and $\beta$ is a user definable constant between 0 and 1, exclusive. In the presently preferred embodiment, $\beta$ is set between 0.1 and 0.2, inclusive.

Next, projection defocus in catadioptric projectors that use thin layer(s) of transparent surfaces is considered. A typical example is projecting through the wine glasses, as is discussed above in reference to FIGS. 9a-92c.

Figure 16:
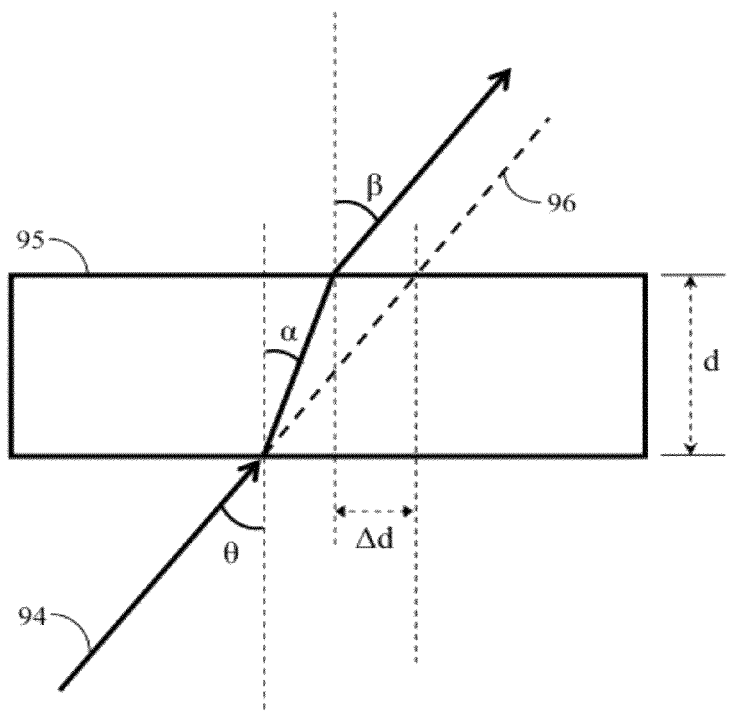
FIG. 16 illustrates how light propagates through a refractor.

With reference to FIG. 16, to study defocusing, one first analyzes how light rays 94 propagate through a refractor 95. Assume d represents the thickness of refractor 95 (wine glasses, in the present example) and m represents its refractive index. For each light ray 94 with incident angle θ, the light ray 94 first enters through the front face of refractor 95, traverses the refractor medium, and then leave the back face of refractor 95. In the present discussion, let α and β represent the front and back exiting angles, respectively. Using Snell's Law, one has:

(sin θ/sin α)=m and (sin α/sin β)=(1/m)

To reduce distortion, one should have θ=β, i.e., the exit direction (i.e. exiting angle β) of light ray 94 at the back face should be the same as the incident direction (i.e. incident angle θ) at the front face of refractor 95. However, light ray 94 is slightly shifted an amount Δd from its line of entry 96 by the refraction equation, as follows:

$$\Delta d = d \tan \theta - d \tan \alpha = d(\tan \theta - [\sin \theta / \sqrt{(m^2 - \sin^2 \theta)}])$$

Figure 17:
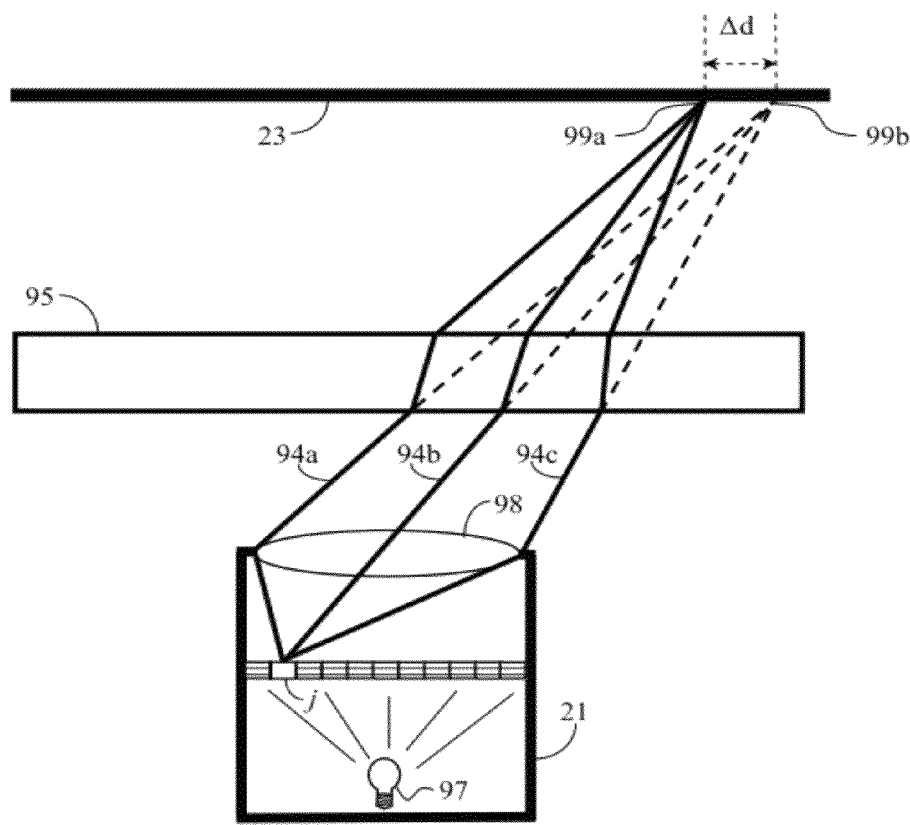
FIG. 17 describes distortion in a projected image due to projection through a refractor.

With reference to FIG. 17 (where elements similar to those of FIGS. 16 and 2 have similar reference characters and are described above), light from a lamp 97 within projector 21 is shown going through a projector pixel j, and being projected through projector lens 97 and refractor medium 95 (i.e. wine glass) onto scene 23, i.e. display screen 23 in the present example. As shown, the light emanating from projector pixel j is focused by lens 98 (as illustrated by spread light rays 94a, 94b, and 94c) onto a point 99a on display screen 23. If it is assumed that projector 21 is placed relatively far away from the display screen 23, then all the light rays 94a-94c that originate from a projector pixel j will have approximately the same incident angle θ. The refraction equation, immediately above, shows that these light rays will be uniformly shifted an amount Δd after passing through thin refractor 95. Since the incident light rays 94a-94c focus at a first point 99b if not refracted, their new focal point 99a will simply be shifted by an amount Δd from the first focal point 99b. If it is assumed that refractor 95 is nearly parallel to display screen 23, the new focal point 99a will still lie on display screen 23, but will be shifted an amount Δd. This implies that projection defocus due to thin refractors is negligible.

Nevertheless, upon exiting the back face of the refractor 95, some portion of the light ray will also be reflected back into the refractor. This leads to scattering artifacts when projecting through thin refractors. However, these scattering artifacts are captured by the LTM T and can be effectively corrected using the inverse LTM-based correction algorithm described above. In the case of thin wine glasses, one need only repeat the analysis on single-layered thin refractors to model both layers of the wine glasses. Scattering artifacts, however, will be more severe when projecting through multiple layers.

Figure 18A:
FIGS. 18a-18d illustrate projection results with and without distortion correction.
Figure 18B:
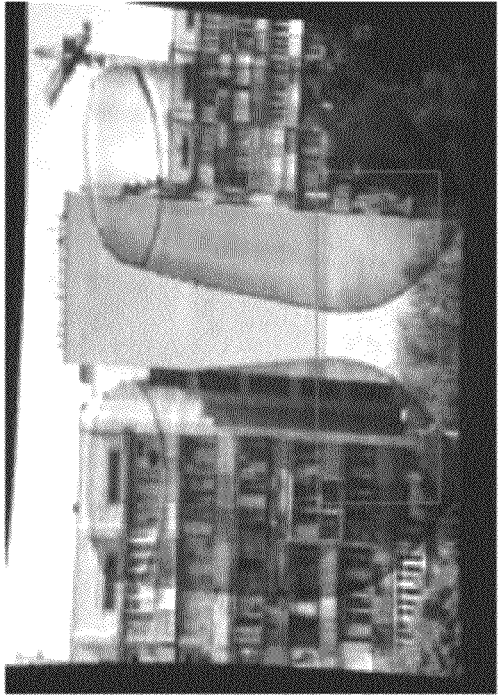
Figure 18C:
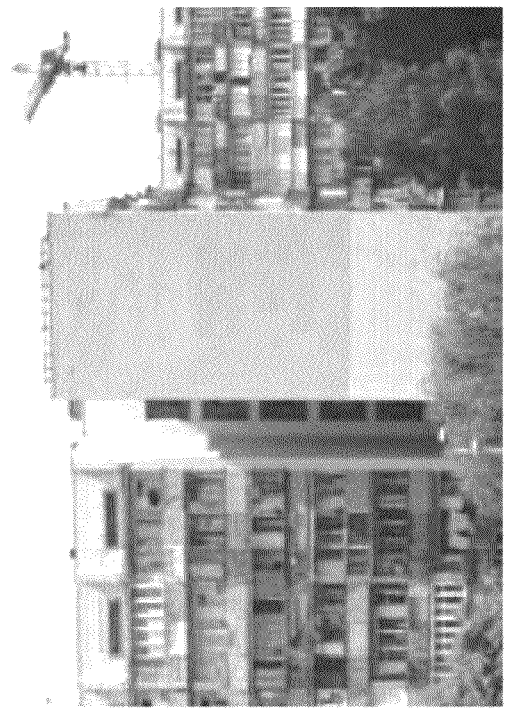
Figure 18D:

As is shown in FIGS. 18a-18d, the present inverse LTM-based approach is able to effectively reduce these artifacts. FIG. 18a is an image of a desired projection result. FIG. 18b is an image of the projection result if the image of FIG. 18a is projected without distortion correction. FIG. 18d is the projection result after distortion correction, and FIG. 18c is the transformed image that is projected to achieve the image FIG. 18d.

The present approach has successfully demonstrated the use of catadioptric projection systems for displaying panoramic and omni-directional images.

Capturing and synthesizing panoramic views of complex scenes have attracted much attention in computer graphics and vision. However, very little work has been done to effectively display these panoramic images. The main difficulty lies in the limited aspect ratio of projectors. For example, it is common for panoramas to have an aspect ratio of 3:1 while a commodity projector can typically achieve at most a 1.2:1 aspect ratio. A simple solution is to enforce the same aspect ratio in the projected image (e.g., by displaying a 1024×200 image). However, this approach would waste a large amount of the projector's resolution. Furthermore, since a projector usually has a narrow field-of-view, it is difficult to display a panorama on a wide area.

Returning to FIG. 3a, in one embodiment of the present invention, projector 21 is implemented as a commodity Epson PowerLite© 78 projector with a 1024×768 resolution, and this is combined with a cylindric mirror 35. Instead of using custom designed mirrors, a commodity 10-dollar plastic, rectangular mirror 35 was used. Plastic mirror 35 was bent to near cylindric shape and placed in front of projector 21. The resulting projection achieved an aspect ratio of 3:1 and the projected source image used the maximum resolution of projector 27, as is shown in FIG. 3b. It should also be noted that the geometry of mirror 27 makes the present projector setup analogous to a "pushbroom camera". That is, the present setup makes a virtual "pushbroom projector", where all pixels on the same row/column have the same perspective or center of projection (COP), while the trajectory of the COP for different column/rows form a vertical/horizontal line. Although the horizontal direction has a lower resolution than the vertical direction, it has been found that the high vertical resolution can often effectively compensate for the low horizontal resolution.

Another use of the present invention is in the area of omni-directional projection. Developing inexpensive solutions for creating omni-direction projection effects in home or school environments, similar to IMAX© theater environments, can significantly benefit education, scientific visualization, and digital entertainment.

However, difficulty in achieving wide use of omni-directional projection in various environments lies in several aspects. Firstly, IMAX© projectors use fisheye lenses to simulate 180 degree projection, whereas most commodity projectors use more typical lenses that have a much smaller field-of-view. Secondly, although it is possible to combine multiple projectors to synthesize omni-directional projections, robust and efficient calibration between multiple projectors is still an open problem. Thirdly, IMAX© systems use dome-shaped projection screens, whereas rooms in homes and schools typically provide only rectangular-shaped projection areas, such as walls in a rectangular room.

With reference to FIG. 2, to address the above-listed difficulties, the presently preferred embodiment synthesizes an omni-directional projection system by combining commodity projector 21 with a commodity, security dome 26 such as those typically used to provide reflective, wide views in convenience stores. In the present embodiment, the reflective security dome 26 is placed in front of projector 21, and the projector is oriented so that it will not block the final projection 23, after reflection. The presently used security dome has a radius of 15 cm, and projector 21 was positioned approximately 20 cm away from security dome 26. This created an approximately 180 degree field-of-view for the final projection 23.

Figure 19A:
FIGS. 19a-19d illustrate imaging results of the present catadioptric projector using a security dome in a rectangular room.
Figure 19B:
Figure 19C:
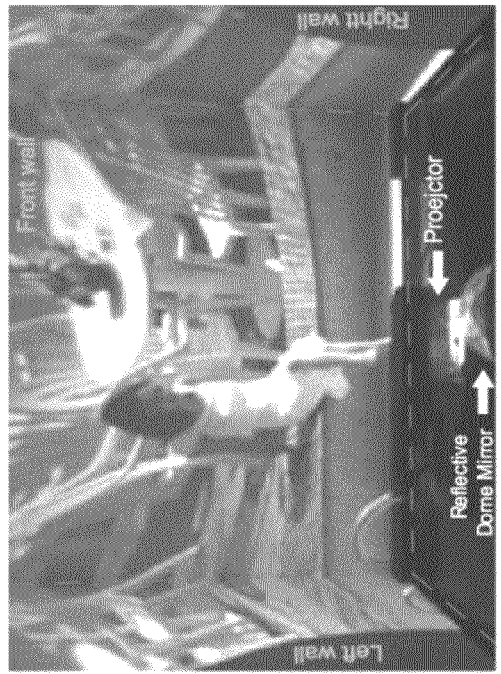
Figure 19D:
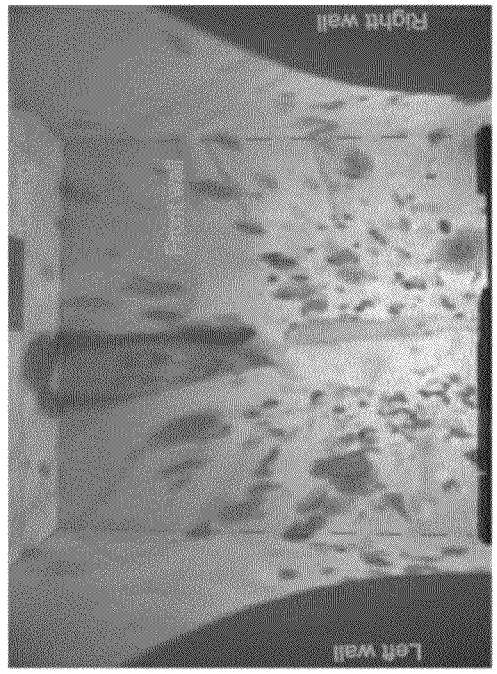

With reference to FIGS. 19a-19d, the present embodiment was setup in a 4 m×6 m×3 m room, and a security dome was positioned about 0.5 m from a front wall. The reflected projection (i.e. the final projection) became omni-directional and covered at least three walls of the room plus its ceiling. FIGS. 19a and 19c show two examples of projection results without compensation, and FIGS. 19b and 19d show the same images after applying inverse LTM and defocus compensation.

Two examples of dome projection within a typical room were described above in reference to FIGS. 7a-7d and 8a-8d. FIGS. 7a and 8a each show a respective desired projection result (i.e. a desired image). Unlike an IMAX© dome, the wall's different orientations cause projection discontinuities, as is shown in FIGS. 7b and 8b. Also observed in FIGS. 7b and 8b, are geometric distortions and non-uniform angular resolutions due to the geometry of the security dome. Additionally, the present setup also suffered from micro-structures in the security dome's geometry. In fact, it was found that the security dome used is far from being perfectly spherical: it has many micro-structures such as bumps and divots. However, the use of the above-described inverse LTM-based algorithm effectively corrected most of these distortions, and the above-described deconvolution method improved non-uniform projection defocus blur. FIGS. 7d and 8d show the final projection results after applying inverse LTM and defocus compensation. FIGS. 7c and 8c are the actually projected, transformed image.

Thus, a catadioptric projector analogous to a catadioptric camera has been presented by combining a commodity digital projector with additional optical units. The present system does not require recovering reflector/refractor geometries. In fact, the present setups used everyday objects such as commodity plastic mirrors and wine glasses, whose geometry is difficult to recover. The present approach models the light transport between the projector and a camera's viewpoint using the light transport matrix (LTM). It has further been shown, above, how to efficiently approximate a pseudo inverse LTM, and how to use it in finding the optimal input image that will incur minimum distortion.

Further presented above is a projection defocus analysis for catadioptric projectors. The defocus blur is interpreted as spatially-varying Gaussian blurs, where the kernels can be directly measured from the LTM. Deconvolution techniques are then applied to pre-process the input image to minimize the defocus blur in the final projection. The practical uses of catadioptric projectors in panoramic and omni-directional projections have thus been demonstrated.

It was shown that by using specially shaped reflectors/refractors, catadioptric projectors can offer an unprecedented level of flexibility in aspect ratio, size, and field-of-view while maintaining sharpness and low geometric and photometric distortions.

A characteristic of the present approach is that it does not separate defocus blur from the actual light transport in the captured LTM. For reflectors and thin refractors, either the defocus blur or the scattering will dominate the non-zero terms in the LTM, and thus, they can be separated. However, for more general reflectors or refractors such as thick refractors, the captured LTM is a mixture of blurs and transport. In future developments, it is expected that the two terms may be effectively acquired and separated by using coded patterns. It is further envisioned to use the present LTM-based framework to recover the specular geometry, e.g., by using path tracing. Also under development is real-time distortion and defocusing compensation methods for displaying panoramic videos using commodity projectors. It is expected that catadioptric projectors will serve as conceptual inspiration for designing new generations of projection systems.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for calibrating a digital projector to a digital camera, said digital projector having an array of projector pixels and said digital camera having an array of sensor pixels, said method including providing at least one processing unit to execute a series of steps comprising:
    (a) obtaining a light transport matrix correlating said array of projector pixels to said array of sensor pixels, said light transport matrix including a plurality of light transport data-sets each corresponding to a separate projector pixel within said array of projector pixels and consisting of light transport data as determined by means of said digital camera;
    (b) generating a blur kernel from said light transport matrix, said blur kernel being indicative of projection blur, said blur kernel further being comprised of a plurality of different defocus data-sets, each of said different defocus data-sets corresponding to a different projector pixel within said projector pixel array;
    (c) for each input image to be projected on said digital projector:
        (1) multiplying said input image by the matrix inverse of said light transport matrix to create an intermediate transformed image;
        (2) applying deconvolution on said intermediate transformed image using said blur kernel to create a final image; and
        (3) submitting said final image for projection on said digital projector.

2. The method of claim 1, wherein in step (b), each defocus data-set within said blur kernel is customized to its corresponding projector pixel.

3. The method of claim 1, wherein step (b) of generating said blur kernel from said light transport matrix comprises:
    for each projector pixel within said projector pixel array:
        (i) identifying a current projector pixel's corresponding light transport data-set within said light transport matrix;
        (ii) within the identified light transport data-set, identifying all nonzero light transport data entries;
        (iii) fitting a two-dimensional Gaussian kernel to the identified nonzero light transport data entries to create the defocus data-set corresponding to the current projector pixel.

4. The method of claim 1, wherein in step (2), deconvolution, using said blur kernel, is applied on said intermediate transformed image using a steepest descent iterative method.

5. The method of claim 1, wherein in step (2), deconvolution is applied on said intermediate transformed image using said blur kernel by the following formulation, where p is said final image, c is said input image, T is said light transport matrix, G is said defocus kernel, D is a current state of a processed image during each iteration, projector pixel coordinates are identified as (r, s), and symbol ⊗ represents a convolution operation, $$p = \arg\min/D\{\|G \otimes D - (T^{-1} \cdot c)\|^2 \text{ and }$$
$$\forall r, s\, 0 \leq D|r,s| \leq 255\}.$$

6. The method of claim 5, wherein said formulation is achieved by defining $\hat{G}$ as a spatially varying kernel satisfying $\hat{g}[r, s] = \hat{g}[t-r, t-s]$, where t is the window size of said blur kernel, and repeating the following sub-steps using c for both Din and $D^0$ in an initial iteration:
    (I) $R = \hat{G} \otimes (D_{in} - G \otimes D^n)$;
    (II) update $D^n$ using $D^{n+1} = D^n + \alpha R$ where $\alpha = \{(|R|^2)/(|G \otimes R|)^2\}$, and individual pixel values within $D^{n+1}$ are clamped to between [0, 255], inclusive, at the end of this step;
    (III) compute the following difference for all pixels [r, s] in consecutive iterations of D by $$\sum_{p,q} |D[r, s]^{n+1} - D_{in}|$$

(IV) Repeat sub-steps (I) to (III) until the computed difference in sub-step (III) is less than a predefined threshold.

7. The method of claim 6, wherein said predefined threshold is set to $\beta m^2$, where $m^2$ is the number of pixels of the desired image c and $\beta$ is a user definable constant between 0 and 1, exclusive.

8. The method of claim 7, wherein $\beta$ is set between 0.1 and 0.2, inclusive.

9. The method of claim 6, wherein image D is arranged as a column signal vector, G and $\hat{G}$ are two sparse matrices, and the convolution is formulated as matrix multiplication.

10. Them method of claim 1, wherein in step (1), creation of said matrix inverse of said light transport matrix includes:
  imposing a Display Constraint upon said light transport matrix, said Display Constraint specifying that any two distinct light rays emitted from the projector will hit the camera's image sensor at distinct parts, wherein the imposing of said Display Constraint comprises:
  for each row in light transport matrix T, comparing matrix entries along a common row of said light transport matrix, and nullifying by assigning zero values to all but the highest valued matrix entry in the common row, the resultant matrix being a modified light transport matrix T*.

11. The method of claim 10, wherein the inverse matrix of said modified light transport matrix T* is generated by:
  identifying in turn each column in said modified light transport matrix as a target column, calculating normalized values for not-nullified entry values in said target column with reference to said target column;
  creating an intermediate matrix of equal size as said modified light transport matrix;
  populating each column in said intermediate matrix with the calculated normalized values of its corresponding target column in said modified light transport matrix, each normalized value in each populated column in said intermediate matrix maintaining a one-to-one correspondence with said not-nullified entry values in its corresponding column in said modified light transport matrix; and
  applying a transpose matrix operation on said intermediate matrix.

12. The method of claim 11, wherein the process of calculating normalized values for not-nullified entry values in said target column with reference to said target column consists of generating a sum of the squares of only said not-nullified entry values in said target column and disregarding all nullified values in said target column, and dividing each not-nullified entry value by said sum.

13. The method of claim 11, wherein if said intermediate matrix is denoted as $\check{T}$, a target column in modified light transport matrix T* is denoted as T*r and a corresponding column in $\check{T}$ is denoted as $\check{T}r$, then the construction and population of $\check{T}$ is defined as $\check{T}r = T*r/(\|T*r\|)^2$.

* * * * *